US012621520B2

(12) United States Patent
Jobanputra et al.

(10) Patent No.: US 12,621,520 B2
(45) Date of Patent: *May 5, 2026

(54) SYSTEMS AND METHODS FOR ROUTING CONTENT TO AN ASSOCIATED OUTPUT DEVICE

(71) Applicant: Amazon Technologies, Inc., Seattle, WA (US)

(72) Inventors: Soniya Jobanputra, Menlo Park, CA (US); Marcello Typrin, Menlo Park, CA (US); Mallory Trudell, Tacoma, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1 day.

This patent is subject to a terminal disclaimer.

(21) Appl. No.: 18/944,708

(22) Filed: Nov. 12, 2024

(65) Prior Publication Data

US 2025/0071372 A1     Feb. 27, 2025

Related U.S. Application Data

(63) Continuation of application No. 17/828,406, filed on May 31, 2022, now Pat. No. 12,192,570, which is a
(Continued)

(51) Int. Cl.
| | |
|---|---|
| *H04N 21/439* | (2011.01) |
| *G06F 3/16* | (2006.01) |
| *G06F 16/3329* | (2025.01) |
| *G06F 40/35* | (2020.01) |
| *G10L 25/51* | (2013.01) |
| *H04N 21/258* | (2011.01) |
(Continued)

(52) U.S. Cl.
CPC ........... *H04N 21/439* (2013.01); *G06F 3/167* (2013.01); *G06F 16/3329* (2019.01); *G06F 40/35* (2020.01); *G10L 25/51* (2013.01); *H04N 21/25875* (2013.01); *H04N 21/4415* (2013.01); *H04N 21/4516* (2013.01); *H04N 21/4751* (2013.01); *H04N 21/835* (2013.01); *H04N 21/8586* (2013.01); *G10L 15/26* (2013.01)

(58) Field of Classification Search
None
See application file for complete search history.

(56) References Cited

U.S. PATENT DOCUMENTS

| | | | | |
|---|---|---|---|---|
| 8,595,771 B1 * | 11/2013 | Sharma | ................ | H04N 21/435 |
| | | | | 725/38 |
| 10,798,431 B2 * | 10/2020 | Jana | ..................... | H04N 21/437 |

(Continued)

*Primary Examiner* — Mushfikh I Alam
(74) *Attorney, Agent, or Firm* — Pierce Atwood LLP

(57)     ABSTRACT

Devices and methods for routing content are provided herein. In some embodiments, a method for routing content include receiving audio data representing a command from a first electronic device, determining content that is associated with the command, sending responsive audio data to the first electronic device, and sending instructions to the second electronic device to output the content associated with the command. In some embodiments, a method for routing contents includes determining a state of the second electronic device and sending instructions to output the content to a selected one of the first and second electronic devices based on the state of the second electronic device.

20 Claims, 15 Drawing Sheets

Related U.S. Application Data continuation of application No. 17/358,515, filed on Jun. 25, 2021, now Pat. No. 11,356,730, which is a continuation of application No. 16/389,471, filed on Apr. 19, 2019, now Pat. No. 11,064,248, which is a continuation of application No. 15/194,064, filed on Jun. 27, 2016, now Pat. No. 10,271,093.

(51) Int. Cl.

| | |
|---|---|
| *H04N 21/4415* | (2011.01) |
| *H04N 21/45* | (2011.01) |
| *H04N 21/475* | (2011.01) |
| *H04N 21/835* | (2011.01) |
| *H04N 21/858* | (2011.01) |
| *G10L 15/26* | (2006.01) |

(56) References Cited

U.S. PATENT DOCUMENTS

| | | | | |
|---|---|---|---|---|
| 11,356,730 B2 * | 6/2022 | Jobanputra | ........ | H04N 21/4751 |
| 2003/0233436 A1 * | 12/2003 | Slemmer | ........... | H04N 21/4131 |
| | | | | 709/223 |
| 2007/0276925 A1 * | 11/2007 | La Joie | ............... | H04N 21/835 |
| | | | | 709/219 |
| 2009/0204663 A1 * | 8/2009 | Patwari | ........... | H04N 21/26613 |
| | | | | 709/203 |
| 2011/0252441 A1 * | 10/2011 | Shkedi | .............. | G06Q 30/0251 |
| | | | | 705/14.1 |
| 2012/0173238 A1 * | 7/2012 | Mickelsen | ............. | G10L 15/30 |
| | | | | 704/E15.001 |
| 2013/0290001 A1 * | 10/2013 | Yun | .................... | H04N 21/4415 |
| | | | | 704/275 |
| 2014/0012587 A1 * | 1/2014 | Park | ....................... | H04W 12/50 |
| | | | | 704/275 |
| 2014/0092007 A1 * | 4/2014 | Kim | ................... | H04N 21/4394 |
| | | | | 345/156 |
| 2014/0123182 A1 * | 5/2014 | Lee | .................... | H04N 21/4333 |
| | | | | 725/37 |
| 2014/0188987 A1 * | 7/2014 | Miller | .................... | H04L 67/55 |
| | | | | 709/203 |
| 2014/0278438 A1 * | 9/2014 | Hart | ........................ | G06F 3/167 |
| | | | | 704/275 |
| 2015/0026206 A1 * | 1/2015 | Miura | ............... | H04N 21/2407 |
| | | | | 707/758 |
| 2015/0086034 A1 * | 3/2015 | Lombardi | ............... | G06F 3/165 |
| | | | | 381/81 |
| 2016/0034253 A1 * | 2/2016 | Bang | ..................... | H04M 1/724 |
| | | | | 715/728 |
| 2016/0217795 A1 * | 7/2016 | Lee | .......................... | G10L 15/22 |
| 2016/0373269 A1 * | 12/2016 | Okubo | .................. | H04L 12/282 |
| 2017/0013331 A1 * | 1/2017 | Watanabe | ............. | H04L 12/282 |
| 2017/0076716 A1 * | 3/2017 | Lee | ...................... | G10L 15/1822 |
| 2018/0053506 A1 * | 2/2018 | Konuma | ................. | G10L 15/22 |
| 2019/0005944 A1 * | 1/2019 | Subhojit | ................. | G10L 15/22 |
| 2019/0022870 A1 * | 1/2019 | Miyazaki | .............. | G10L 15/075 |
| 2019/0279620 A1 * | 9/2019 | Talwar | .................... | G10L 15/22 |
| 2019/0304443 A1 * | 10/2019 | Bhagwan | ................ | G06F 3/167 |
| 2019/0378508 A1 * | 12/2019 | Touyama | ................ | G10L 13/08 |
| 2020/0098354 A1 * | 3/2020 | Lin | ......................... | G10L 15/22 |

* cited by examiner

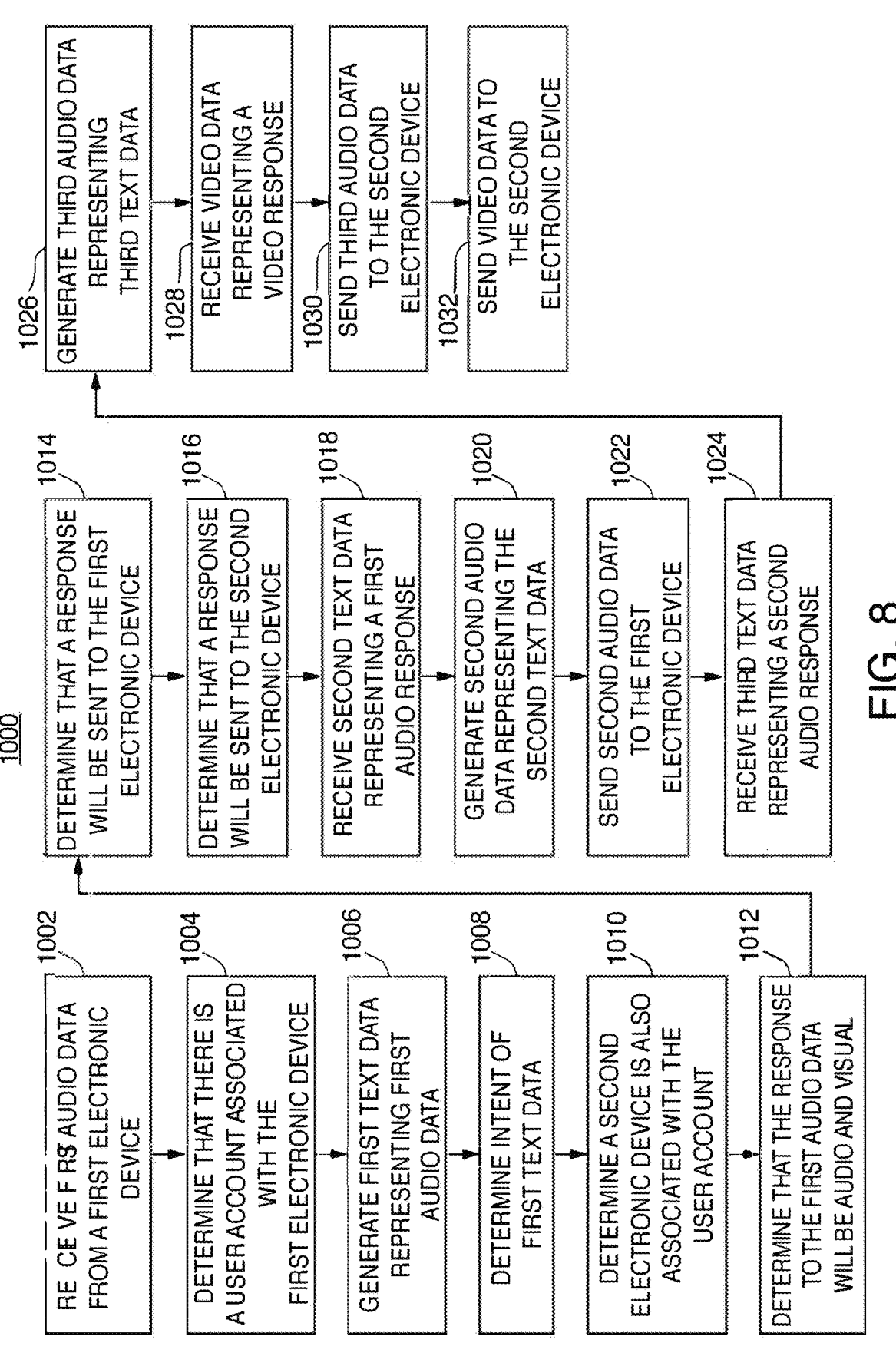

1000

1002 — RECEIVE FIRST AUDIO DATA FROM A FIRST ELECTRONIC DEVICE

1004 — DETERMINE THAT THERE IS A USER ACCOUNT ASSOCIATED WITH THE FIRST ELECTRONIC DEVICE

1006 — GENERATE FIRST TEXT DATA REPRESENTING FIRST AUDIO DATA

1008 — DETERMINE INTENT OF FIRST TEXT DATA

1010 — DETERMINE A SECOND ELECTRONIC DEVICE IS ALSO ASSOCIATED WITH THE USER ACCOUNT

1012 — DETERMINE THAT THE RESPONSE TO THE FIRST AUDIO DATA WILL BE AUDIO AND VISUAL

1014 — DETERMINE THAT A RESPONSE WILL BE SENT TO THE FIRST ELECTRONIC DEVICE

1016 — DETERMINE THAT A RESPONSE WILL BE SENT TO THE SECOND ELECTRONIC DEVICE

1018 — RECEIVE SECOND TEXT DATA REPRESENTING A FIRST AUDIO RESPONSE

1020 — GENERATE SECOND AUDIO DATA REPRESENTING THE SECOND TEXT DATA

1022 — SEND SECOND AUDIO DATA TO THE FIRST ELECTRONIC DEVICE

1024 — RECEIVE THIRD TEXT DATA REPRESENTING A SECOND AUDIO RESPONSE

1026 — GENERATE THIRD AUDIO DATA REPRESENTING THIRD TEXT DATA

1028 — RECEIVE VIDEO DATA REPRESENTING A VIDEO RESPONSE

1030 — SEND THIRD AUDIO DATA TO THE SECOND ELECTRONIC DEVICE

1032 — SEND VIDEO DATA TO THE SECOND ELECTRONIC DEVICE

FIG. 8

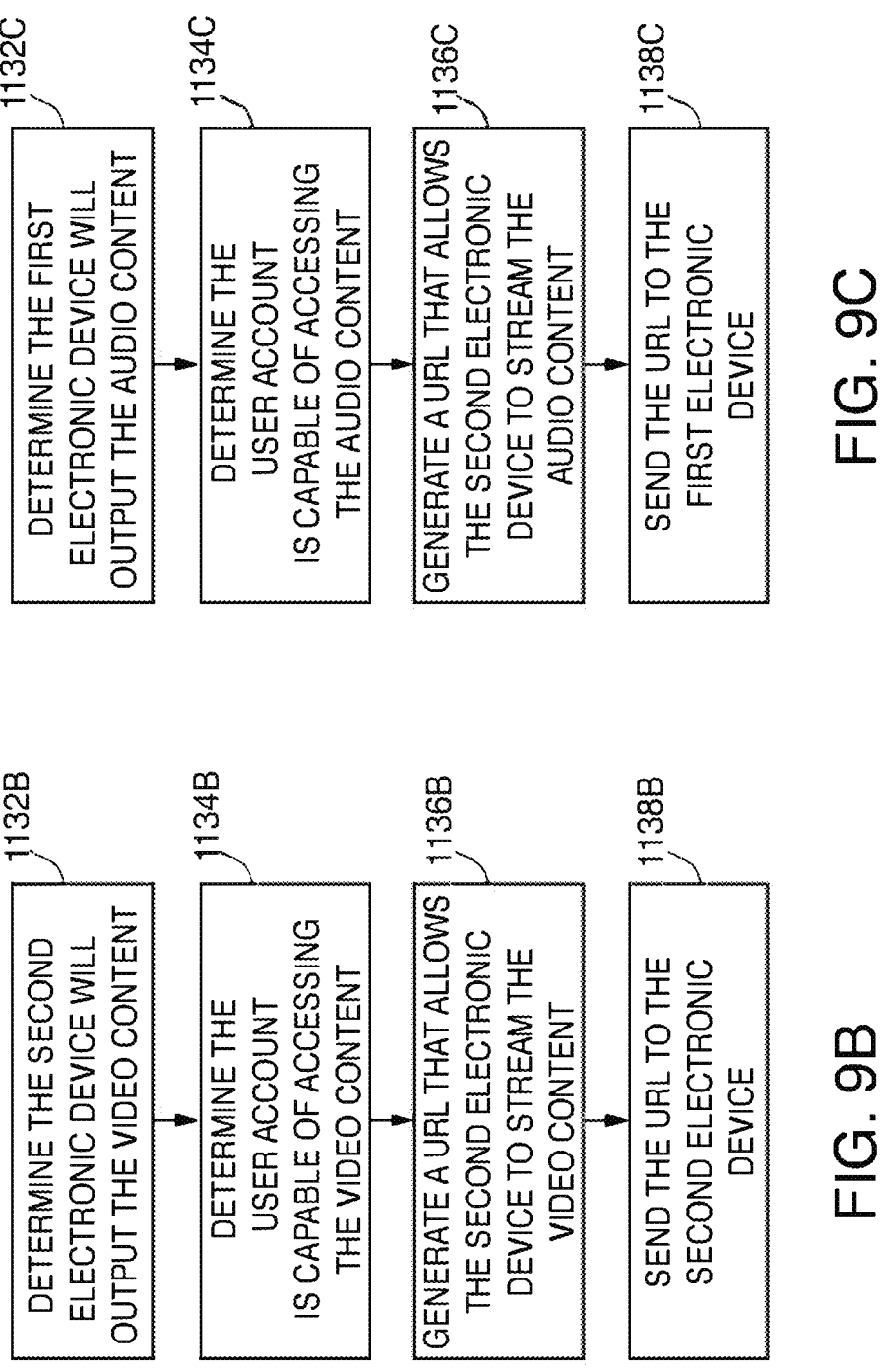

1132C — DETERMINE THE FIRST ELECTRONIC DEVICE WILL OUTPUT THE AUDIO CONTENT

1134C — DETERMINE THE USER ACCOUNT IS CAPABLE OF ACCESSING THE AUDIO CONTENT

1136C — GENERATE A URL THAT ALLOWS THE SECOND ELECTRONIC DEVICE TO STREAM THE AUDIO CONTENT

1138C — SEND THE URL TO THE FIRST ELECTRONIC DEVICE

FIG. 9C

1132B — DETERMINE THE SECOND ELECTRONIC DEVICE WILL OUTPUT THE VIDEO CONTENT

1134B — DETERMINE THE USER ACCOUNT IS CAPABLE OF ACCESSING THE VIDEO CONTENT

1136B — GENERATE A URL THAT ALLOWS THE SECOND ELECTRONIC DEVICE TO STREAM THE VIDEO CONTENT

1138B — SEND THE URL TO THE SECOND ELECTRONIC DEVICE

FIG. 9B

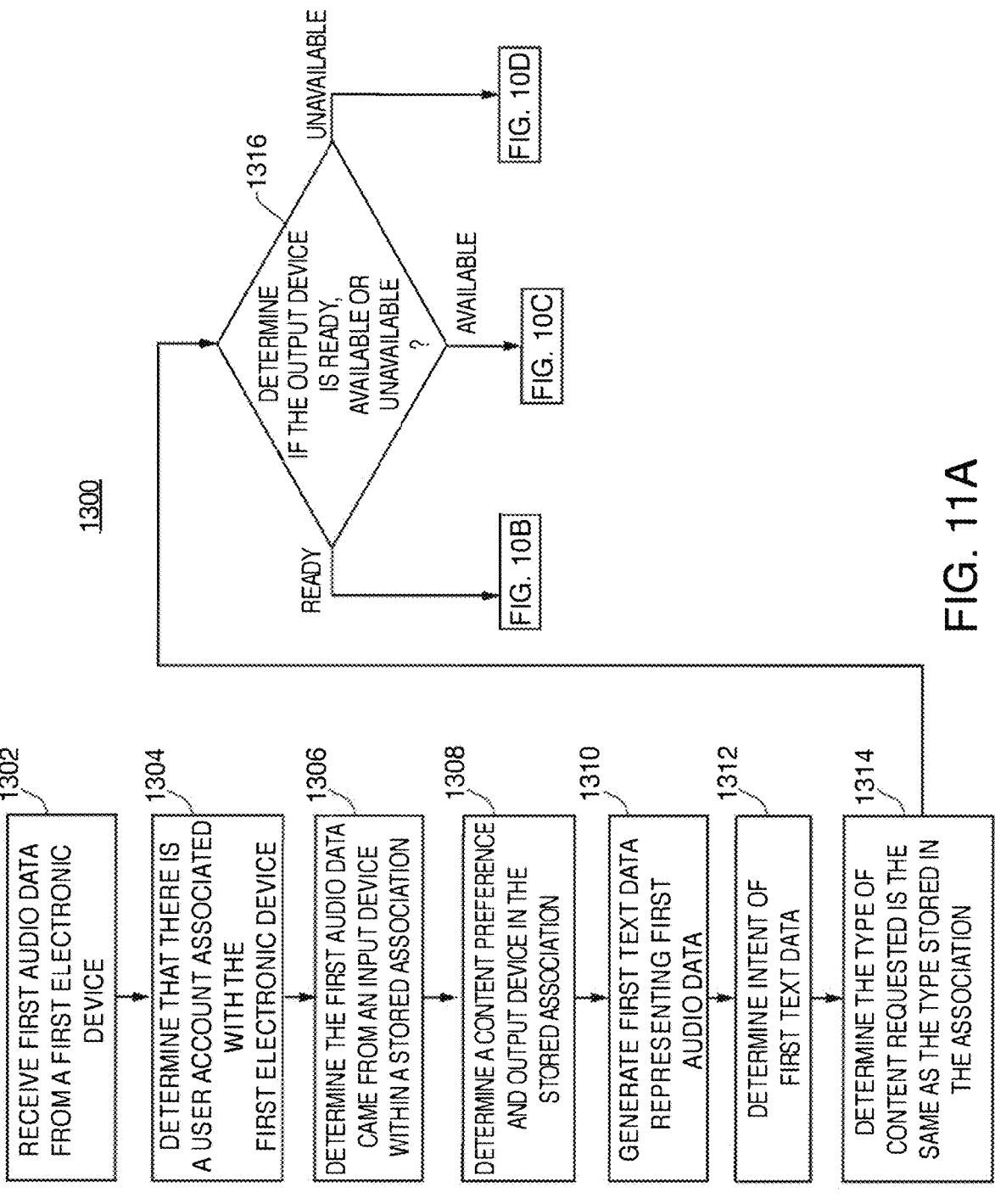

1300

1302 RECEIVE FIRST AUDIO DATA FROM A FIRST ELECTRONIC DEVICE

1304 DETERMINE THAT THERE IS A USER ACCOUNT ASSOCIATED WITH THE FIRST ELECTRONIC DEVICE

1306 DETERMINE THE FIRST AUDIO DATA CAME FROM AN INPUT DEVICE WITHIN A STORED ASSOCIATION

1308 DETERMINE A CONTENT PREFERENCE AND OUTPUT DEVICE IN THE STORED ASSOCIATION

1310 GENERATE FIRST TEXT DATA REPRESENTING FIRST AUDIO DATA

1312 DETERMINE INTENT OF FIRST TEXT DATA

1314 DETERMINE THE TYPE OF CONTENT REQUESTED IS THE SAME AS THE TYPE STORED IN THE ASSOCIATION

1316 DETERMINE IF THE OUTPUT DEVICE IS READY, AVAILABLE OR UNAVAILABLE ?

READY → FIG. 10B

AVAILABLE → FIG. 10C

UNAVAILABLE → FIG. 10D

FIG. 11A

SYSTEMS AND METHODS FOR ROUTING CONTENT TO AN ASSOCIATED OUTPUT DEVICE

CROSS-REFERENCE TO RELATED APPLICATION DATA

This application is a continuation of, and claims the benefit of priority of, U.S. Non-Provisional patent application Ser. No. 17/828,406, filed May 31, 2022, entitled "Systems and Methods for Routing Content To An Associated Output Device," which is a continuation of, and claims the benefit of priority of, U.S. Non-Provisional patent application Ser. No. 17/358,515, filed Jun. 25, 2021, entitled "Systems and Methods for Routing Content To An Associated Output Device," issued as U.S. Pat. No. 11,356,730, which is a continuation of, and claims the benefit of priority of, U.S. Non-Provisional patent application Ser. No. 16/389, 471, filed Apr. 19, 2019, entitled "Systems and Methods for Routing Content To An Associated Output Device," issued as U.S. Pat. No. 11,064,248, which is a continuation of, and claims the benefit of priority of, U.S. Non-Provisional patent application Ser. No. 15/194,064, filed Jun. 27, 2016, entitled "Systems and Methods for Routing Content To An Associated Output Device," issued as U.S. Pat. No. 10,271,093, the contents of each of which are expressly incorporated herein by reference in their entirety.

BACKGROUND

Electronic devices, such as voice activated electronic devices are relatively new, but becoming more common. Individuals can interact with their electronic devices to perform a variety of basic functions, such as making phone calls to streaming content. Discussed herein are improvements to electronic devices and to backend machines that work with these electronic devices.

BRIEF DESCRIPTION OF THE DRAWINGS

FIG. 8 is an illustrative flowchart of a process sending content to an associated device in accordance with various embodiments;

FIG. 9B is an illustrative flowchart continuing the process in FIG. 9A where the content is routed to an associated device based on the content in accordance with various embodiments;

FIG. 9C is an illustrative flowchart continuing the process in FIG. 9A where the content is routed to an electronic device based on the content in accordance with various embodiments;

FIG. 11A is an illustrative flowchart of a process for routing content based on a state of an associated device in accordance with various embodiments;

DETAILED DESCRIPTION

Figure 1:
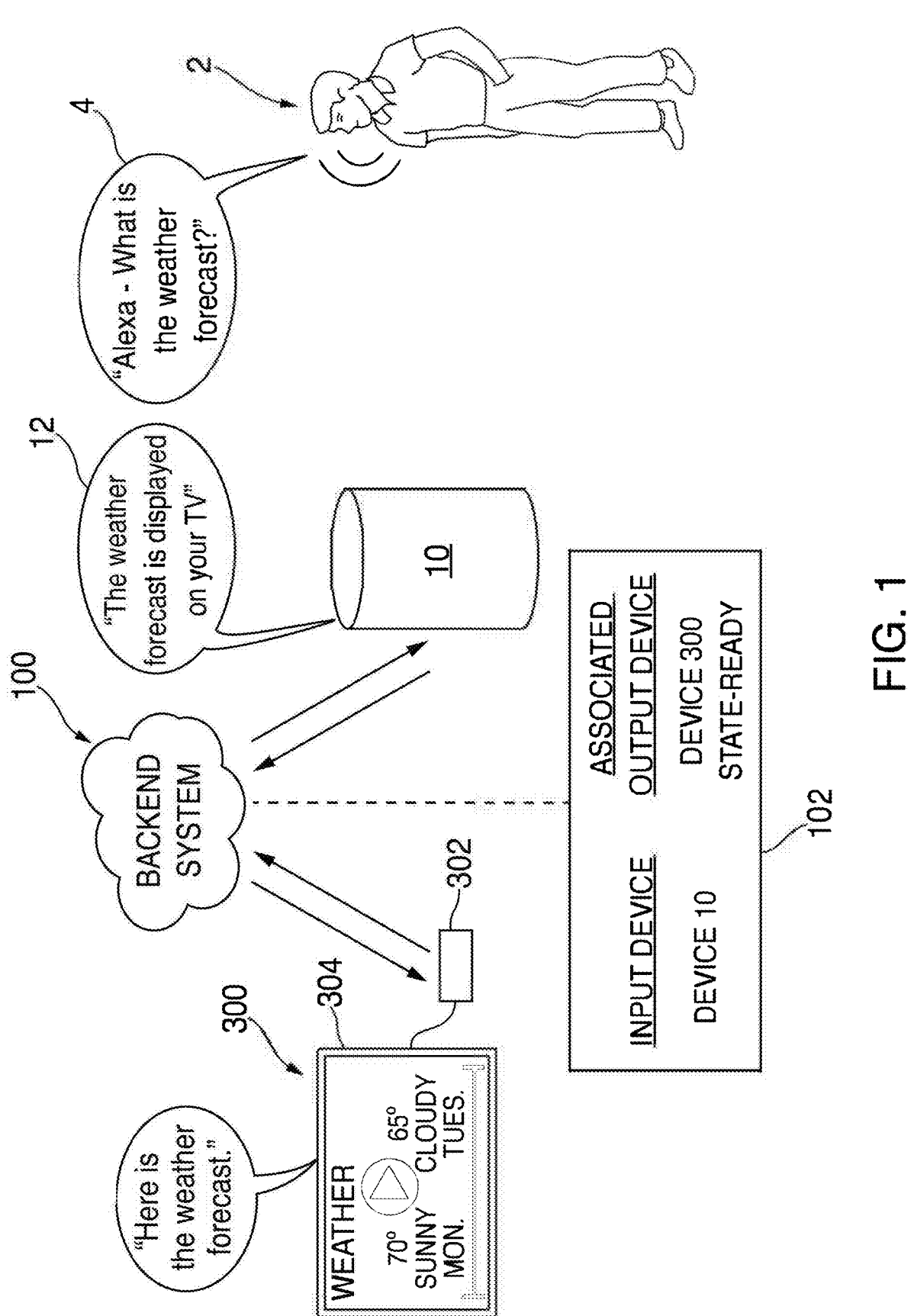
FIG. 1 is an illustrative diagram of a system for routing content to an associated output electronic device in accordance with various embodiments.

The present disclosure, as set forth below, is generally directed to various embodiments of methods and devices related to receiving a command, such as a request for content, at one device and outputting the requested content through another device.

In some embodiments, an individual may say an utterance, such as a request to hear a weather forecast, to the voice activated electronic device. The voice activated electronic device may use one or more microphones or transducers to capture the audio signal of the spoken command which can be converted into audio data that represents the spoken utterance. The voice activated electronic device may send the audio data to the backend system. The voice activated electronic device, in some embodiments, may be associated with a user account that is also associated with an output electronic device such as, for example, a television and/or a media streaming device connected to a television. The association between the user account and both the voice activated electronic device and the output electronic device may be stored in a cloud-based backend system. The backend system may recognize this association by first identifying a device identifier associated with the voice activated electronic device. The device identifier then may be used to determine the user account that is associated with the device identifier. Once the cloud-based backend system identifies a user account associated with the voice activated electronic device, the cloud-based backend system may then identify all products associated with the identified user account. In this example, the cloud-based backend system may identify a television is also associated with the identified user account.

Once the cloud-based backend system determines or while determining the products associated with the voice activated electronic device, the cloud-based backend system may then convert the audio data representing the utterance to text data by executing speech-to-text (STT) functionality on the audio data. Once the audio data is converted to text data, the cloud-based backend system will then figure out the intent of the utterance by executing natural language understanding (NLU) functionality on the text data representing the audio data. The NLU will figure out the intent and meaning of the text data. For example, the cloud-based backend system may determine that the spoken utterance includes a request to hear a weather forecast on a target device. The NLU may then determine that the target device is the output device associated with the user account. Once the cloud-based backend system figures out what the spoken utterance is requesting, the cloud-based backend system will search for an appropriate response. For example, in response to a request for the weather forecast, the cloud-based backend system may find text data stating the weather forecast. Additionally, the backend system may find that visual information responsive to the utterance is available. In some embodiments, once visual information responsive to the utterance is found, the cloud-based backend system may determine that the target device is capable of displaying the visual information. Furthermore, if the user account is associated with a television the backend system may further determine that because the voice activated electronic device is associated with the television, the response should include two responses. The first response may be sent to the voice activated electronic device. The second response may be sent to the television. The second response, in some embodiments, may include an audio response and a visual response.

In some embodiments, after the cloud-based backend system decides that the responses will be sent to both the voice activated electronic system and a television, the cloud-based backend system may receive text data representing a response to the utterance for the voice activated electronic device. This text data may be converted to audio data executing text-to-speech (TTS) functionality on the responsive text data. After the audio data is created by executing TTS, the audio data may be sent to the voice activated electronic device. Once received by the voice activated electronic device, the audio data may be played by one or more speakers on the voice activated electronic device. For example, the voice activated electronic device might state, "The weather forecast in Seattle is being displayed on your television."

The cloud-based backend system may also receive the video data representing the responsive visual information. Before sending the video data to the television, the cloud-based backend system may recognize that second audio data should be generated to be sent along with the video data to the television. The cloud-based backend system may then receive text data representing a response to the utterance for the television. As with the text data responsive to the utterance for the voice activated electronic device, the text data for the television may be converted to audio data executing TTS functionality on the responsive text data for the television. After the audio data is created by executing TTS, the audio data and the video data may be sent to the television. Once received by the television, the audio data and video data may be played by the television. For example, the television might state, "Here is the forecast in Seattle." In some embodiments, the backend system may also send the requested content to the output electronic device.

In some embodiments, an individual may state an utterance to the voice activated electronic device that might have two different meanings. For example, the individual might state, "Alexa, play Footloose." In this situation, "play Footloose" may have two different meanings. For example, play can refer to an action for, among other types of content, both a movie and a song. The cloud-based backend system would convert the audio data of the spoken utterance "Alexa, play Footloose," to text data by executing STT functionality on the audio data. Once the audio data is converted to text data, the cloud-based backend system will then try to figure out the intent of the utterance by applying NLU functionality on the text data representing the audio data. The NLU will attempt figure out the intent of the text data. In some embodiments, the NLU will receive two confidence scores from two separate domains. Each of these confidence scores may exceed a predetermined threshold. If the NLU receives two confidence scores that exceed the predetermined threshold, the cloud-based backend system may determine that more information is needed to send a correct response.

Once it is determined more information is needed, the cloud-based backend system may receive query text data representing an intent question asking whether the utterance was asking for a response from the first domain or the second domain. The cloud-based backend system may then convert the query text data to audio data by executing TTS functionality on the query text data. Before sending the audio data representing a query, the cloud-based backend system may generate listening instructions for the voice activated electronic device. In some embodiments, the listening instructions may instruct the voice activated electronic device to listen for a response after the query audio is played. After the listening instructions are generated, the cloud-based backend system may send the audio data representing the query to the voice activated electronic device. On one or more of its speakers, the voice activated electronic device may play the audio data. For example, the voice activated electronic device may play "Did you want to play the movie Footloose, or the song Footloose?" The cloud-based backend system may then send the listening instructions to the voice activated electronic device instructing the voice activated electronic device to listen for a response to the query and send audio data representing the response to the query to the could-based backend system. In some embodiments, once the query has been played by the voice activated electronic device, the voice activated electronic device may send a response to the cloud-based backend system. This response will be received by the cloud-based backend system as audio data. The audio data will be converted into a text file by STT and analyzed by the NLU. Based on the analyzed confirmation response, the cloud-based backend system will be able to figure out the intent of the original utterance.

For example, if the response was "the movie," the cloud-based backend system may check to see a device associated a user account, also associated to the voice electronic device, can stream the movie. If the device can stream the movie, then the cloud-based backend system may check to see if the user account is capable of accessing the movie. If the user account is capable of accessing the movie, the cloud-based backend system will generate a URL that allows the device to stream the movie. Once the URL is generated, the cloud-based backend system may send the URL to the device such that the device starts streaming the movie.

If the response was "the song," the cloud-based backend system will determine that a song is to be played on the voice activated electronic device. The cloud-based backend system may then generate a URL that allows the voice activated electronic device to stream the song. Once the URL has been generated, the cloud-based backend system may send the generated URL to the voice activated electronic device such that the song is played on at least one speaker of the voice activated electronic device. Once the song starts playing on the voice activated electronic device, an individual might state an additional utterance to the voice activated electronic device. This utterance may be a request to play the same song, but on the television. For example, the individual might have stated, "Play Footloose the song on the television." After the cloud-based backend system executes STT functionality on the received audio and NLU functionality on text data representing the received audio data, the cloud-based backend system may recognize that the individual wants the same song played on the television.

After recognizing the utterance is a request to play the same song on the television, the cloud-based backend system may generate stop instructions for the voice activated user device. The cloud-based backend system will then send an instruction to the voice activated electronic device to stop playing the song. The generated instructions may then be sent to the voice activated electronic device, causing the voice activated electronic device to stop streaming the song. After the voice activated device has stopped streaming the song, the cloud-based backend system will receive another URL allowing the television to stream the song. The URL of the song may then be sent to the television to be played starting at the time the song was stopped on the voice activated electronic device. In some embodiments, a notification may be generated by the cloud-based back end system, then sent to and played by the voice activated electronic device notifying the user that the song will be played on the television. For example, the voice activated electronic device play "The song Footloose will play on your television."

In some embodiments, the output electronic device may include a media streaming device connected to a peripheral output device. The media streaming device may also control the peripheral output device. For example, in some embodiments, the peripheral output electronic device may be a television connected to the media streaming device. The peripheral output device may not be directly connected to the backend system. In other words, the backend system may only be able to communicate with or control the peripheral output device via the media streaming device. In embodiments where the output electronic device includes the peripheral output device, the instructions to output the content that the backend system sends to the output electronic device may cause the media streaming device to control the peripheral electronic device to output the content.

In some embodiments, the cloud-based backend system may determine that there is a stored association on the cloud-based backend system. This association may have a stored input device, output device, and content preference. In some embodiments, once the voice activated electronic device has sent audio data representing a first utterance, the cloud-based backend system may recognize that the voice activated electronic device is an input device in the stored association. After recognizing this, the cloud-based backend system may look to see what the output device is and if there is a content preference. For example, the stored association may be between a voice activated electronic device and a television. The stored content preference may be songs. If this is the case, in some embodiments, a request for a song from the voice activated user device will cause the cloud-based backend system to send the requested song to the television.

In some embodiments, the cloud-based backend system may determine whether the requested content should be output based on the state of the output electronic device. For example, in embodiments where the output electronic device is a television, a request to play content on a television may be dependent on whether the television is in an unavailable state, an available state or a ready state. In order to determine what state the television is in, in some embodiments, the cloud-based backend system may send a status request to the television. If the television does not send a status response back in a predetermined amount of time, the television may be deemed unavailable. If the television does send a status response back within the predetermined amount of time, the status response may include data that indicates whether the television is in a ready mode or an available mode.

In some embodiments, the television may be in an unavailable state when the television is off. If the cloud-based backend system determines that the television is in an unavailable state, the cloud-based backend system may receive text representing a notification. The cloud-based backend system may then generate audio data representing the notification text by executing TTS functionality. The audio data may then be sent to and played by the voice activated device. For example, the voice activated device may play "Your television is unavailable." Once the notification has been played by the voice activated device, the cloud-based backend system may then receive the requested content. This requested content may then be sent to the voice activated electronic device such that the content is played by the voice activated electronic device.

In response to being notified the television is in an unavailable state, an individual may turn the television on, effectively making the television in a ready state. Once in a ready state, the cloud-based backend system may receive a status update from the television, notifying the cloud-based backend system that the television is in a ready state. The cloud-based backend system may then receive text representing a prompt. The cloud-based backend system may then generate audio data representing the text by executing TTS functionality. Before sending the prompt, the cloud-based backend system may generate listening instructions for the voice activated electronic device. The audio data may then be sent to and played by the voice activated device. For example, the voice activated device may play "Would you like to play the content on your television?" The cloud-based backend system may then send the listening instructions to the voice activated electronic device. The listening instructions may cause the voice activated electronic device to listen for a response and send audio data representing the response to the cloud-based backend system.

A response to the request may then be received by the cloud-based backend system indicating the content should continue on the television. Stopping instructions may then be generated by the cloud-based backend system in order to stop the content on the voice activated electronic device. The cloud-based backend system may then send the stopping instruction to the voice activated electronic device to stop playing the content. After the voice activated device has stopped playing the content, the cloud-based backend system may receive the content again. The content may then be sent to the television so the television can play the content. In some embodiments, a notification may be generated by the cloud-based back end system, then sent to and played by the voice activated electronic device notifying the user that the content will be played on the television. For example, the voice activated electronic device play "The content will be played on your television."

In some embodiments, the television may be in a ready state when the television is not performing other tasks and is ready to receive and play content. If the television is in a ready state, the cloud-based backend system may receive responsive text data and responsive video data. The cloud based backend system may generate audio data by executing TTS functionality on the text data. The responsive audio data and video data may then be sent to the television to be played. In some embodiments, a notification may be generated by the cloud-based back end system, then sent to and played by the voice activated electronic device notifying the user that the content will be played on the television. For example, the voice activated electronic device play "The content will continue on your television."

In some embodiments, the television may be in an available state when the television is performing other tasks. If the television is an available state, the cloud-based backend system may generate instructions for the television to alter states from available to ready. Once generated, the cloud-based backend system may send the instructions. Once the status has been altered, the television may send a confirmation cloud-based backend system that the status has been changed from available to ready. Once the television is in a ready state, the cloud-based backend system may receive responsive text data and responsive video data. The cloud based backend system may generate audio data by executing TTS functionality on the text data. The responsive audio data and video data may then be sent to the television to be played. In some embodiments, a notification may be generated by the cloud-based back end system, then sent to and played by the voice activated electronic device notifying the user that the content will be played on the television. For example, the voice activated electronic device play "The content will continue on your television." In some embodiments, a notification may be generated by the cloud-based back end system, then sent to and played by the voice activated electronic device notifying the user that the content will be played on the television. For example, the voice activated electronic device play "The content will continue on your television."

FIG. 1 is an illustrative diagram of a system for routing content in accordance with various embodiments. In one exemplary non-limiting embodiment, a voice activated electronic device 10 may communicate with a backend system 100 which, in turn, may communicate with an output electronic device 300 associated with voice activated electronic device 10. An individual 2 may say a command 4 to a voice activated electronic device 10, or in a room or volume of space where voice activated electronic device 10 is located. Command 4, as used herein, may refer to any question, request, comment, and/or instructions that may be spoken to voice activated electronic device 10. For example, individual 2 may ask, "Alexa—What is the weather forecast?"

Spoken voice commands, in some embodiments, are prefaced by a wakeword, which may also be referred to as a trigger expression, wake expression, or activation word. In response to detecting an utterance of the wakeword, voice activated electronic device 10 may be configured to detect and interpret any words that subsequently follow the detected wakeword as actionable inputs or commands. In some embodiments, voice activated electronic device 10 may be activated by a phrase or grouping of words, which voice activated electronic device 10 may also be configured to detect. Voice activated electronic device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however persons of ordinary skill in the art will recognize that the any word (e.g., "Amazon"), or series of words (e.g., "Wake Up" or "Hello, Alexa") may alternatively be used as the wakeword. Furthermore, the wakeword may be set or programmed by an individual operating voice activated electronic device 10, and in some embodiments more than one wakeword (e.g., two or more different wakewords) may be available to activate a voice activated electronic device. In yet another embodiment, the trigger that is used to activate voice activated electronic device 10 may be any series of temporally related sounds.

In some embodiments, the trigger expression may be a non-verbal sound. For example, the sound of a door opening, an alarm going off, glass breaking, a telephone ringing, or any other sound may alternatively be user to activate device 10. In this particular scenario, detection of the non-verbal sound by device 10, which alternatively may be described as a sound activated electronic device, which may be substantially similar to voice activated electronic device 10, may cause a certain action or response to occur. For example, if the sound of a door opening is detected, which is also the sound activated device's trigger, that detected trigger may cause a burglar alarm to turn on.

Voice activated electronic device 10 may detect spoken command 4 using one or more microphones resident thereon. After detecting command 4, voice activated electronic device 10 may send audio data representing command 4 to backend system 100. Voice activated electronic device 10 may also send one or more additional pieces of associated data to backend system 100. Various types of associated data that may be included with the audio data include, but are not limited to, a time and/or date that command 4 was detected by voice activated electronic device 10, a location of voice activated electronic device 10 (e.g., a GPS location), an IP address associated with voice activated electronic device 10, a type of device that voice activated electronic device 10 is, or any other type of associated data, or any combination thereof. For example, when individual 2 says command 4, voice activated electronic device 10 may obtain a GPS location of device 10 to determine where individual 2 is and a time/date (e.g., hour, minute, second, day, month, year, etc.) that command 4 was made.

The audio data and associated data may be transmitted over a network, such as the Internet, to backend system 100 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between voice activated electronic device 10 and backend system 100. In some embodiments, voice activated electronic device 10 and backend system 100 may communicate with one another via a web browser using HTTP. Various additional communication protocols may be used to facilitate communications between voice activated electronic device 10 and backend system 100 including but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Backend system 100 may include one or more servers, each in communication with one another, voice activated electronic device 10, and/or output electronic device 300. Backend system 100 and output electronic device 300 may communicate with each other using any of the aforementioned communication protocols. Each server within backend system 100 may be associated with one or more databases or processors that are capable of storing, retrieving, processing, analyzing, and/or generating data to be provided to voice activated electronic device 10. For example, backend system 100 may include one or more servers that each correspond to a category. As an example, backend system 100 may include a "weather" category server including one or more databases of weather information (e.g., forecasts, radar images, allergy information, etc.). As another example, backend system 100 may include a "sports" category server including one or more databases having various sports or sporting information (e.g., scores, teams, games, etc.). As still yet another example, backend system 100 may include a "traffic" category server including one or more databases including traffic information for various geographical regions (e.g., street maps, traffic alerts, traffic statuses, directional information, etc.). Backend system 100 may, in some embodiments, correspond to a collection of servers located within a remote facility, and individuals may store data on backend system 100 and/or communicate with backend system 100 using one or more of the aforementioned communications protocols.

In some embodiments, backend system 100 may include one or more servers capable of storing a data structure 102 associating voice activated electronic device 10 with output electronic device 300. Data structure 102 may be, for example, a file, database entries or other type of data structure that is capable of storing information indicating the association between voice activated electronic device 10 and output electronic device 300. Data structure 102 may include, for example, device identification information for voice activated electronic device 10 and output electronic device 300. Data structure 102 may also include additional information about voice activated electronic device 10 and/or output electronic device 300. In some embodiments, data structure 102 may include a type of output electronic device 300 (e.g., television, media streaming device, speaker system, etc.). Data structure 102 may further include information on a state (e.g., ready, available, unavailable) of output electronic device 300. Backend system 100 may determine from data structure 102, whether voice activated electronic device 10 is associated with output electronic device 300.

Output electronic device 300 may be any type of electronic device or devices that capable of outputting visual and/or audible content. In some embodiments, output electronic device 300 may include a media streaming device 302 and a peripheral video output device 304 (e.g. a television or monitor) connected to media streaming device 302. Video output device may be any device capable of receiving and outputting content. Media streaming device 302 may be capable of receiving content from backend system 100 or other information sources and providing such content to video output device 304 according to a protocol compatible with video output device 304. In some embodiments, media streaming device 302 may provide content to video output device 304 according to a high-definition multimedia interface (HDMI) protocol. Media streaming device 302 may also be able to communicate with and control video output device 304. For example, media streaming device 302 may be able to communicate with video output device 304 to determine whether video output device 304 is turned on. Media streaming device 302 may also be able to communicate with video output device 304 to determine whether video output device 304 is set to an input source associated with media streaming device 302. Media streaming device 302 may also control video output device 304 to perform functions such as turning on or off, switching to a selected input source, adjusting volume of video output device 304, or controlling other functions of video output device 304. In some embodiments, media streaming device 302 may communicate with and control video output device 304 using a Consumer Electronics Control (CEC) protocol. The CEC protocol is an HDMI feature that allows one device to control another device connected to it via an HDMI protocol. It will be appreciated by those skilled in the art that media streaming device 302 may communicate with and control video output device 304 using other protocols as well. In some embodiments, output electronic device may be a video output device that incorporates the functionality of media streaming device 302 (e.g., a smart television). Additionally, in some embodiments, output electronic device 300 may be an audio output device such as a speaker or a system of speakers (e.g., a base unit and a number of peripheral speakers connected to the base unit).

Referring back to backend system 100, once backend system 100 receives the audio data from voice activated electronic device 10, backend system 100 may analyze the audio data by, for example, executing STT functionality on the audio data to determine which words were included spoken command 4. Backend system 100 may then execute NLU functionality in order to determine the intent or meaning of spoken command 4. Backend system 100 may further determine a response to spoken command 4. In some embodiments, backend system 100 may determine that voice activated electronic device 10 is associated with output electronic device 300 and may also determine that the response to spoken command 4 should include outputting content through output electronic device 300. Additionally, backend system 100 may determine that the response should include outputting a notification through voice activated electronic device 10 to notify individual 2 that content will be output through output electronic device 300. Backend system 100 may also determine that the response should include outputting a notification through output electronic device 300 to notify individual that the content will be output through output electronic device 300. The backend system is described in more detail below in the description of FIG. 3.

For example, in some embodiments, the response to spoken command 4 may include content such as, for example, a weather forecast. Backend system 100 may first determine that output electronic device 300 is associated with voice activated electronic device 10 by looking up the association between voice activated electronic device 10 and output electronic device 300 stored in data structure 102. Backend system 100 may then determine that the content should be output through output electronic device 300. In some embodiments, determining that output electronic device 300 is associated with voice activated electronic device 10 is sufficient to determine that the content should be output through output electronic device 300. However, in some embodiments, backend system 100 may take into account additional information such as the state of output electronic device 300, the type of content, user preferences, or other additional information in determining whether the content should be output through output electronic device 300, as will be described in more detail. Upon determining that the content should be output through output electronic device 300, backend system 100 may generate first responsive audio data using text-to-speech (TTS) processing. The first responsive audio data may represent a first audio message 12 notifying individual 2 that the content will be output by output electronic device 300. Backend system 100 may send the first responsive audio data to voice activated electronic device 10. In some embodiments, backend system 100 may also send data to voice activated electronic device 10 representing instructions that cause first audio message 12 to play on voice activated electronic device 10 when received. For example, after receiving the first audio data and any associated instructions, first audio message 12, such as "The weather forecast is displayed on your TV," may play on voice activated electronic device 10. First audio message 12 may also incorporate information identifying output electronic device 300 (e.g., "your TV", "your speaker system", etc.).

Backend system 100 may also generate second responsive audio data using TTS processing. The second responsive audio data may represent a second audio message 14 notifying individual 2 that the content will be output by output electronic device 300. After sending the first responsive data to voice activated electronic device 10, backend system 100 may send the second audio data to output electronic device 300. In some embodiments, backend system 100 may also send data to output electronic device 300 representing instructions that cause second audio message 14 to play on output electronic device 300 when received. For example, after receiving the second audio data and any associated instructions, second audio message 14, such as "Here is the weather forecast," may play on output electronic device 300. Playing audio message 12 on voice activated electronic device 10 and then subsequently playing audio message 14 on output electronic device 300 provides an enhanced experience for individual 2 by notifying individual 2 where the content will be output and allowing individual 2 to identify output electronic device 300 where the content will be output.

In some embodiments, subsequent to sending first responsive audio data to voice activated electronic device 10 and second responsive audio data to output electronic device 300, backend system 100 may send instructions to output electronic device 300 that cause output electronic device 300 to output the content responsive to spoken command 4. Backend system 100 may also send the content responsive to spoken command 4 to output electronic device 300. For example, in some embodiments, backend system 100 may determine that the response to spoken command 4 should include content such as a weather forecast. Backend system 100 may retrieve the content (e.g., a weather forecast) from one or more of the category servers (e.g., the "weather" category server) and send the content, along with instructions to output the content, to output electronic device 300. Upon receiving the content and instructions, output electronic device 300 may output the content (e.g., display the weather forecast). Although a weather forecast has been described as a type of content associated with embodiments of the disclosed concept, it will be appreciated by those having ordinary skill in the art that the content may include various types of visual and/or audible content (e.g., movies, pictures, audio books, music, etc.).

In some embodiments, backend system 100 may send instructions to output electronic device 300 that cause output electronic device 300 to output the content and output electronic device 300 may obtain the content from a source other than backend system 100. In some embodiments, the content may already be stored on output electronic device 300 and thus, backend system 100 does not need to send the content to output electronic device 300. Also, in some embodiments, output electronic device 300 may be capable of retrieving content from a cloud-based system other than backend system 100. For example, output electronic device 300 may be connected to a video or audio streaming service other than backend system 100. Backend system 100 may send output electronic device 300 instructions that cause output electronic device 300 to retrieve and output selected content from the cloud-based system such as the video or audio streaming service. For example, backend system 100 may determine that the command 4 includes a request to play a specific show. Backend system 100 may determine that content from a video streaming service is available to be played. For example, a user account associated with voice activated electronic device 10 may include information indicating that individual 2 is subscribed to the video streaming service. Backend system 100 may further determine that the requested show is available through the video streaming service by communicating with the video streaming service or consulting other information sources such as a database identifying which content is available through the video streaming service. Finally, backend system 100 may send instructions to output electronic device 300 which cause output electronic device 300 to request the show from the video streaming service and begin playing the requested show.

Figure 2:
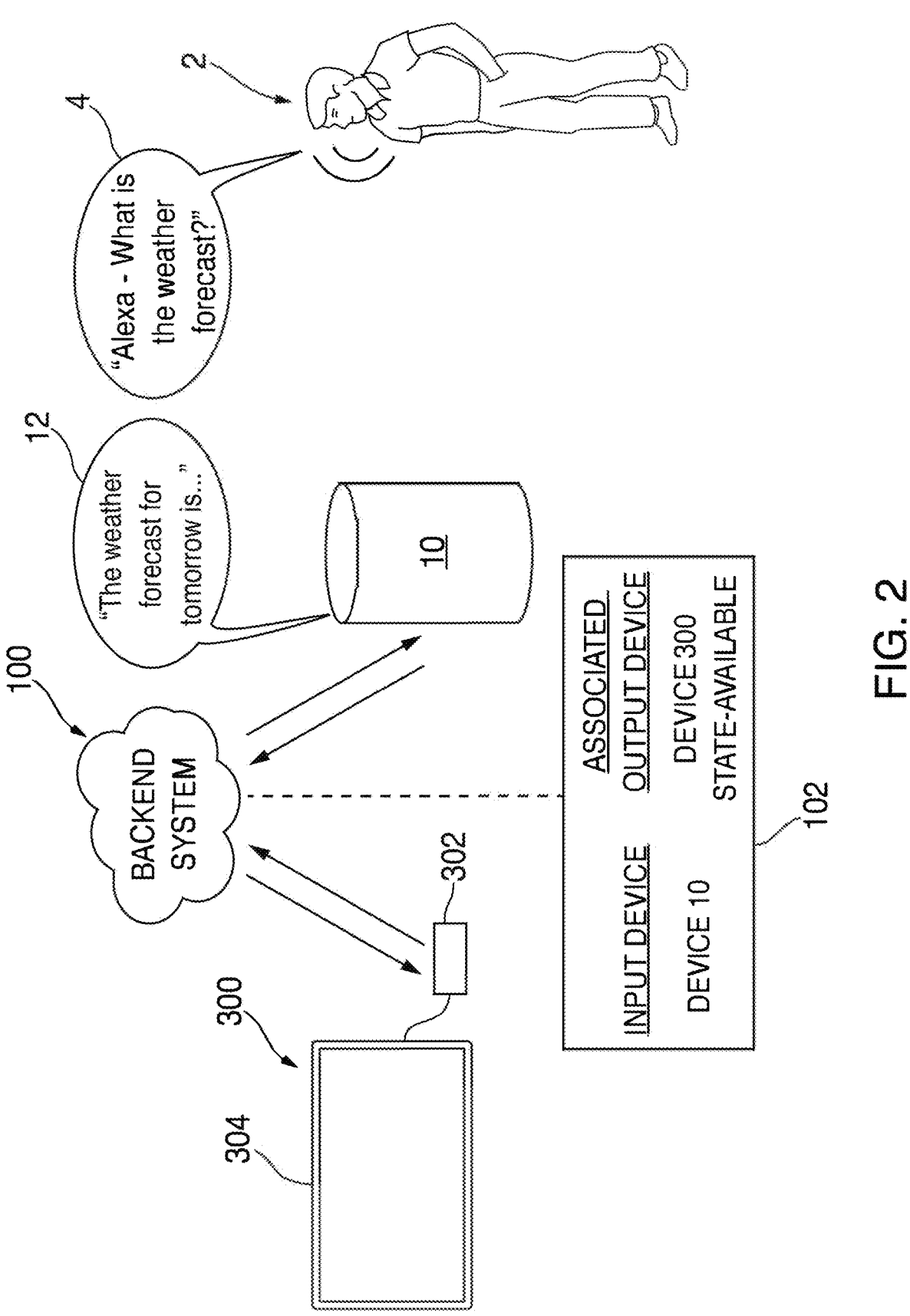
FIG. 2 is an illustrative diagram of a system for routing content based on a state of an associated output electronic device in accordance with various embodiments.

Referring to FIG. 2, an illustrative diagram for routing content based on the state of output electronic device 300 in accordance with various embodiments is shown. In some embodiments, a state of output electronic device 300 may be considered by backend system 100 when determining whether the response to spoken command 4 should include outputting content through output electronic device 300. For example, output electronic device 300 may have a ready state, an available state, and an unavailable state. In the ready state, output electronic device 300 may be ready to output content. For example, in some embodiments, in the ready state media streaming device 302 is on and peripheral video output device is on and set to the input source associated with media streaming device 302. In the available state, output electronic device 300 may be available to output content, but additional steps may need to be taken to make output electronic device 300 ready to output the content. For example, in some embodiments, output electronic device 300 may be in the available state when media streaming device 302 is powered on, but peripheral video output device 304 is powered off or is not set to the input source associated with media streaming device 302. Media streaming device 302 may need to control video output device 304 to power on or switch its input to the input source associated with media streaming device 302 before output electronic device 300 is ready to output content. In the unavailable state, output electronic device 300 is not available to output content. For example, in some embodiments, output electronic device 300 may be in the unavailable state when media streaming device 302 is powered off. Also, in some embodiments, output electronic device 300 may be in the unavailable state when peripheral video output device 304 is disconnected from media streaming device 304.

In some embodiments, backend system 100 may determine the state of output electronic device 300. For example, backend system 100 communicate with output electronic device 300 with a query requesting the state of output electronic device 300. Output electronic device 300 may determine its state and may respond with information indicating its state. For example, media streaming device 302 may receive the query from backend system 100 and then may communicate with peripheral video output device 304 in order to determine whether peripheral video output device 304 is connected, powered on, and set to the input source associated with media streaming device 302. Media streaming device 302 may use the CEC protocol to communicate with peripheral video output device 304 and determine whether peripheral video output device 304 is connected, powered on, and set to the input source associated with media streaming device 302. For example, if media streaming device 302 determines that peripheral video output device 304 is connected, powered on, and set to the input source associated with media streaming device 302, media streaming device 302 may determine that output electronic device (e.g., media streaming device 302 and peripheral video output device 304) is in the ready state. Media streaming device 302 may communicate information indicating the state of output electronic device 300 to backend system 100 and backend system 100 may store the information. In some embodiments, backend system 100 may determine that output electronic device 300 is unavailable based on a failure of output electronic device 300 to respond to the query from backend system 100. In some embodiments, backend system 100 may store information indicating the determined state of output electronic device 300 in for example, data structure 102.

Based on the determined state of output electronic device 300, backend system 100 may determine where to route requested content. For example, in some embodiments, backend system 100 may determine that spoken command 4 includes a request for content that should be output by output electronic device 300 if output electronic device 300 is in the ready state. However, if output electronic device 300 is not in the ready state (e.g., output electronic device is in the available or unavailable state), backend system 100 may send the requested content to voice activated electronic device 10. For example, if the requested content is the weather forecast, backend system 100 may retrieve the content (e.g., a weather forecast) from one or more of the category servers (e.g., the "weather" category server). Backend system 100 may generate responsive audio data using text-to-speech (TTS) processing and the responsive audio data may represent an audio message 12 incorporating the content. Backend system 100 may send the responsive audio data to voice activated electronic device 10 along with data representing instructions that cause audio message 12 to play on voice activated electronic device 10 when received. For example, after receiving return file 8, audio message 12, such as "The weather forecast for tomorrow is sunny and seventy degrees," may play on voice activated electronic device 10. On the other hand, if backend system 100 determines that output electronic device 300 is in the ready state, backend system 100 may proceed to send first responsive audio data representing audio message 12 notifying individual 2 that the content will be output by output electronic device 300. Backend system 100 may subsequently send second responsive audio data to output electronic device 300 notifying individual 2 that the content will be output by output electronic device 300 and then send instructions to output the content to output electronic device 300.

Figure 3:
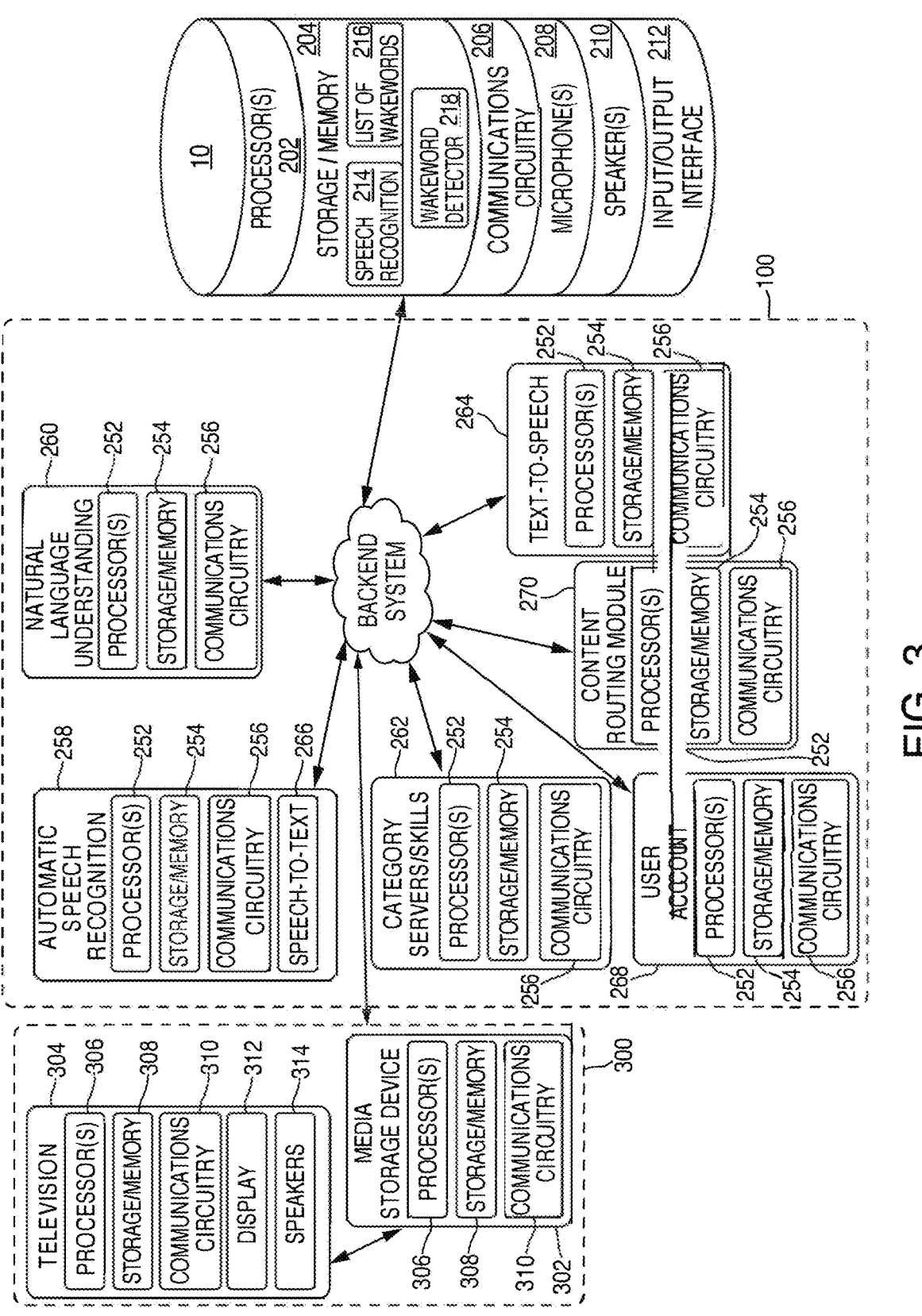
FIG. 3 is an illustrative diagram of the architecture of the system of FIG. 1 in accordance with various embodiments.

FIG. 3 is an illustrative diagram of the architecture of the system of FIG. 1 in accordance with various embodiments. Voice activated electronic device 10, in some embodiments, may correspond to any type of electronic device capable of activated in response to detecting a specific sound. Voice activated electronic device 10 may, in some embodiments, after detecting the specific sound (e.g., a wakeword or trigger), recognize commands (e.g., audio commands, inputs) within captured audio, and may perform one or more actions in response to the received commands. Various types of electronic devices may include, but are not limited to, desktop computers, mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories. In some embodiments, voice activated electronic device 10 may be relatively simple or basic in structure such that no mechanical input option(s) (e.g., keyboard, mouse, trackpad) or touch input(s) (e.g., touchscreen, buttons) may be provided. For example, voice activated electronic device 10 may be able to receive and output audio, and may include power, processing capabilities, storage/memory capabilities, and communication capabilities.

Voice activated electronic device 10 may include a minimal number of input mechanisms, such as a power on/off switch, however primary functionality, in one embodiment, of voice activated electronic device 10 may solely be through audio input and audio output. For example, voice activated electronic device 10 may listen for a wakeword (e.g., "Alexa" or "Amazon") by continually monitoring local audio. In response to the wakeword being detected, voice activated electronic device 10 may establish a connection with backend system 100, send audio data to backend system 100, and await/receive a response from backend system 100. In some embodiments, however, non-voice activated electronic devices may also communicate with backend system 100 (e.g., push-to-talk or tap-to-talk devices). For example, electronic device 10, in one embodiment, corresponds to a manually activated electronic device, and the foregoing descriptions may be equally applicable to a non-voice activated electronic device.

Voice activated electronic device 10 may include one or more processors 202, storage/memory 204, communications circuitry 206, one or more microphones 208 or other audio input devices (e.g., transducers), one or more speakers 210 or other audio output devices, as well as an optional input/output ("I/O") interface 212. However, one or more additional components may be included within voice activated electronic device 10, and/or one or more components may be omitted. For example, voice activated electronic device 10 may include a power supply or a bus connector. As another example, voice activated electronic device 10 may not include an I/O interface. Furthermore, while multiple instances of one or more components may be included within voice activated electronic device 10, for simplicity only one of each component has been shown.

Processor(s) 202 may include any suitable processing circuitry capable of controlling operations and functionality of voice activated electronic device 10, as well as facilitating communications between various components within voice activated electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for voice activated electronic device 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on voice activated electronic device 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include one or more modules and/or databases, such as speech recognition module 214, list of wakewords database 216, and wakeword detection module 218. Speech recognition module 214 may, for example, include an automatic speech recognition ("ASR") component that recognizes human speech in detected audio. Speech recognition module 214 may also include a natural language understanding ("NLU") component that determines user intent based on the detected audio. Also included within speech recognition module 214 may be a text-to-speech ("TTS") component capable of converting text to speech to be outputted by speaker(s) 210, and/or a speech-to-text ("STT") component capable of converting received audio signals into text to be sent to backend system 100 for processing.

List of wakewords database 216 may be a database stored locally on voice activated electronic device 10 that includes a list of a current wakeword for voice activated electronic device 10, as well as one or more previously used, or alternative, wakewords for voice activated electronic device 10. In some embodiments, individual 2 may set or program a wakeword for voice activated electronic device 10. The wakeword may be programmed directly on voice activated electronic device 10, or a wakeword or words may be set by the individual via a backend system application that is in communication with backend system 100. For example, individual 2 may use their mobile device having the backend system application running thereon to set the wakeword. The specific wakeword may then be communicated from the mobile device to backend system 100, which in turn may send/notify voice activated electronic device 10 of the individual's selection for the wakeword. The selected activation may then be stored in database 216 of storage/memory 204.

Wakeword detection module 218 may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter may be a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice activated electronic device 10 may then begin transmitting the audio signal to backend system 100 for detecting and analyzing subsequent utterances made by individual 2.

Communications circuitry 206 may include any circuitry allowing or enabling voice activated electronic device 10 to communicate with one or more devices, servers, and/or systems. For example, communications circuitry 206 may facilitate communications between voice activated electronic device 10 and backend system 100. Communications circuitry 206 may use any communications protocol, such as any of the previously mentioned exemplary communications protocols. In some embodiments, voice activated electronic device 10 may include an antenna to facilitate wireless communications with a network using various wireless technologies (e.g., Wi-Fi, Bluetooth®, radiofrequency, etc.). In yet another embodiment, voice activated electronic device 10 may include one or more universal serial bus ("USB") ports, one or more Ethernet or broadband ports, and/or any other type of hardwire access port so that communications circuitry 206 allows voice activated electronic device 10 to communicate with one or more communications networks.

Voice activated electronic device 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, voice activated electronic device 10 may include multiple microphones (e.g., four, seven, ten, etc.) placed at various positions about voice activated electronic device 10 to monitor/capture any audio outputted in the environment where voice activated electronic device 10 is located. The various microphones 208 may include some microphones optimized for distant sounds, while some microphones may be optimized for sounds occurring within a close range of voice activated electronic device 10.

Voice activated electronic device 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where voice activated electronic device 10 may be located. In some embodiments, speaker(s) 210 may include headphones or ear buds, which may be wirelessly connected, or hard-wired, to voice activated electronic device 10, that may be capable of broadcasting audio directly to individual 2.

In some embodiments, voice activated electronic device 10 may be hard-wired, or wirelessly connected, to one or more speakers 210. For example, voice activated electronic device 10 may cause one or more speakers 210 to output audio thereon. In this particular scenario, voice activated electronic device 10 may receive audio to be output by speakers 210, and voice activated electronic device 10 may send the audio to speakers 210 using one or more communications protocols. For instance, voice activated electronic device 10 and speaker(s) 210 may communicate with one another using a Bluetooth® connection, or another near-field communications protocol. In some embodiments, voice activated electronic device 10 may communicate with speaker(s) 210 indirectly.

In some embodiments, one or more microphones 208 may serve as input devices to receive audio inputs, such as speech from individual 2. Voice activated electronic device 10, in the previously mentioned embodiment, may then also include one or more speakers 210 to output audible responses. In this manner, voice activated electronic device 10 may function solely through speech or audio, without the use or need for any input mechanisms or displays.

In one exemplary embodiment, voice activated electronic device 10 includes I/O interface 212. The input portion of I/O interface 212 may correspond to any suitable mechanism for receiving inputs from a user of voice activated electronic device 10. For example, a camera, keyboard, mouse, joystick, or external controller may be used as an input mechanism for I/O interface 212. The output portion of I/O interface 212 may correspond to any suitable mechanism for generating outputs from voice activated electronic device 10. For example, one or more displays may be used as an output mechanism for I/O interface 212. As another example, one or more lights, light emitting diodes ("LEDs"), or other visual indicator(s) may be used to output signals via I/O interface 212 of voice activated electronic device 10. In some embodiments, one or more vibrating mechanisms or other haptic features may be included with I/O interface 212 to provide a haptic response to individual 2 from voice activated electronic device 10. Persons of ordinary skill in the art will recognize that, in some embodiments, one or more features of I/O interface 212 may be included in a purely voice activated version of voice activated electronic device 10. For example, one or more LED lights may be included on voice activated electronic device 10 such that, when microphone(s) 208 receive audio from individual 2, the one or more LED lights become illuminated signifying that audio has been received by voice activated electronic device 10. In some embodiments, I/O interface 212 may include a display screen and/or touch screen, which may be any size and/or shape and may be located at any portion of voice activated electronic device 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

Backend system 100, as mentioned previously, may, in some embodiments, be in communication with voice activated electronic device 10. Backend system 100 includes various components and modules including, but not limited to, automatic speech recognition ("ASR") module 258, natural language understanding ("NLU") module 260, skills module 262, text-to-speech ("TTS") module 264, and user accounts module 268. A speech-to-text ("STT") module 266 may be included in the ASR module 258. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for backend system 100, such as, a speaker identification ("ID") module, a user profile module, or any other module, or any combination thereof.

Backend system 100 may also include a content routing module 270. Content routing module 270 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions of the latter may apply. Data structure 102 may be stored within content routing module 270. Content routing module 270 may be configured such that it determines whether content should be output by voice activated electronic device 10 or output electronic device 300. Content routing module 270 may also store programs and/or instructions to facilitate determining whether content should be output by voice activated electronic device 10 or output electronic device 300.

ASR module 258 may be configured such that it recognizes human speech in detected audio, such as audio captured by voice activated electronic device 10. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions of the latter may apply. NLU module 260 may be configured such that it determines user intent based on the detected audio received from voice activated electronic device 10. NLU module 260 may include processor(s) 252, storage/memory 254, and communications circuitry 256. In some embodiments, ASR module 258 may include STT module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND® speech processing technologies available from the Autonomy Corporation, which is headquartered in Cambridge, England, United Kingdom.

Skills module 262 may, for example, correspond to various action specific skills or servers capable of processing various task specific actions. Skills module 262 may further correspond to first party applications and/or third party applications operable to perform different tasks or actions. For example, based on the context of audio received from voice activated electronic device 10, backend system 100 may use a certain application or skill to retrieve or generate a response, which in turn may be communicated back to voice activated electronic device 10. Skills module 262 may include processor(s) 252, storage/memory 254, and communications circuitry 256. As an illustrative example, skills 262 may correspond to one or more game servers for storing and processing information related to different game (e.g., "Simon Says," karaoke, etc.). As another example, skills 262 may include one or more weather servers for storing weather information and/or providing weather information to voice activated electronic device 10.

TTS module 264 may employ various text-to-speech techniques. Techniques for transcribing speech into text are well known in the art and need not be described in further detail herein, any suitable computer implemented speech to text technique may be used to convert the received audio signal(s) into text, such as SOFTSOUND® speech processing technologies available from the Autonomy Corporation, which is headquartered in Cambridge, England, United Kingdom. TTS module 264 may also include processor(s) 252, storage/memory 254, and communications circuitry 256. In some embodiments, one or more filters may be applied to received audio data to reduce or minimize extraneous noise.

User accounts module 268 may store one or more user profiles corresponding to users having a registered account on backend system 100. For example, a parent may have a registered account on backend system 100, and each of the parent's children may have their own user profile registered under the parent's registered account. Information, settings, and/or preferences, for example, for each user profile may be stored within a user profile database. In some embodiments, user accounts module 268 may store a voice signal, such as voice biometric information, for a specific user profile. This may allow speaker identification techniques to be used to match a voice to voice biometric data associated with a specific user profile. In some embodiments, user accounts module 268 may store a telephone number assigned to a particular user profile. User accounts module 268 may also include processor(s) 252, storage/memory 254, and communications circuitry 256.

Persons of ordinary skill in the art will recognize that although each of ASR module 258, NLU module 260, skills module 262, TTS module 264, and user accounts module 268 include instances of processor(s) 252, storage/memory 254, and communications circuitry 256, those instances of processor(s) 252, storage/memory 254, and communications circuitry 256 within each of ASR module 258, NLU module 260, skills module 262, TTS module 264, and user accounts module 268 may differ. For example, the structure, function, and style of processor(s) 252 within ASR module 258 may be substantially similar to the structure, function, and style of processor(s) 252 within NLU module 260, however the actual processor(s) 252 need not be the same entity.

Backend system 100, as mentioned previously, may, in some embodiments, also be in communication with output electronic device 300. In some embodiments, output electronic device 300 may include media streaming device 302 and peripheral video output device 304 connected to media streaming device 302. Media streaming device 302 may include processor(s) 306, storage/memory 308, and communications circuitry 310. As previously mentioned, media streaming device 302 may be in communication with peripheral video output device 304. Additionally, media streaming device 302 may be in communication with cloud-based systems such as audio or video streaming services. Various types of output electronic devices include, but are not limited to, televisions, portable media players, cellular telephones or smart phones, pocket-sized personal computers, personal digital assistants ("PDAs"), desktop computers, laptop computers, tablet computers, and/or electronic accessory devices such as smart watches and bracelets.

Peripheral video output device 304 may include processor(s) 306, storage/memory 308, communications circuitry 310, display 312, and speaker(s) 314. Display 312 may be a display screen and/or touch screen, which may be any size and/or shape and may be located at any portion of voice activated electronic device 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof.

It will be appreciated by those having ordinary skill in the art that media streaming device 302 and peripheral video output device 304 may be separate devices in some embodiments, or may be combined into a single device in some embodiments. For example, the functionality of media streaming device 302 may be integrated into video output device 304 without departing from the scope of the disclosed concept. Media streaming device may be any device capable of communicating with backend system 100. Various types of media streaming devices include, but are not limited to, Fire TV Sticks, Fire TV sticks with Voice Remote, a television, portable media players, cellular telephones or smart phones, pocket-sized personal computers, personal digital assistants ("PDAs"), desktop computers, laptop computers, tablet computers, and/or electronic accessory devices such as smart watches and bracelets. It will also be appreciated by those having ordinary skill in the art the media streaming device 302 and peripheral video output device 304 are one example of output electronic device 300. Output electronic device 300 may be any type of electronic device or combination of devices capable of outputting audible or visual content. For example, in some embodiments, output electronic device 300 may include media streaming device 302 and one or more connected peripheral audio devices such as speakers.

Figure 4:
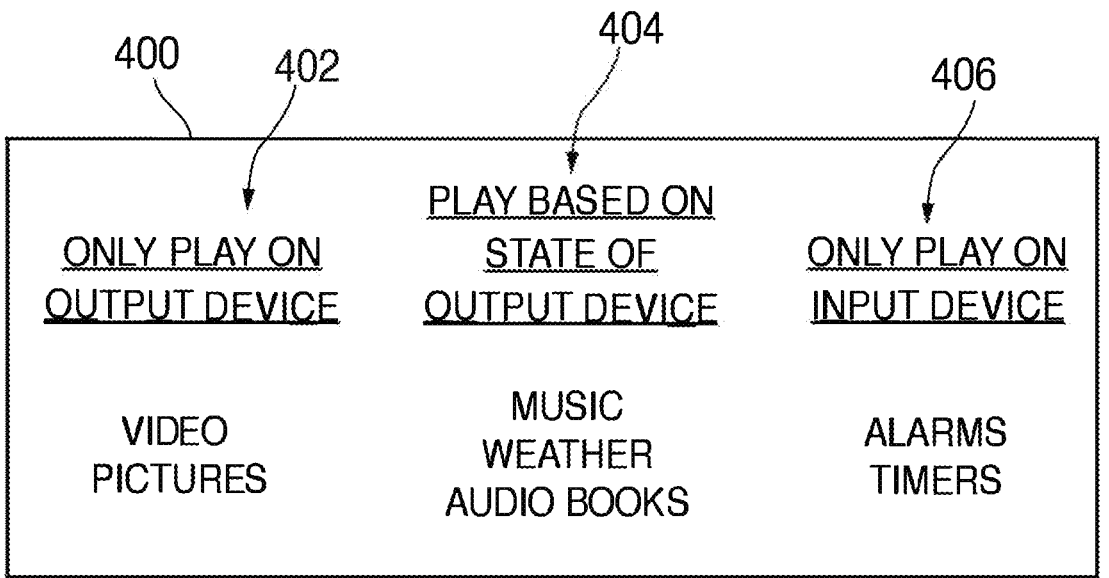
FIG. 4 is another illustrative diagram of table including categories of types of content in accordance with various embodiments.

FIG. 4 illustrates a table 400 of different categories of content in accordance with embodiments of the disclosed concept. Backend system 100 may further take into consideration the type of content that is requested when determining where to send the content. For example, table 400 illustrates different types of content divided into different categories which indicate where backend system 100 should route the content. Table 400 may include a first category 402 for content types that should only be output by output electronic device 300. In the example shown in FIG. 4, first category 402 includes video and pictures. In some embodiments, backend system 100 may determine that spoken command 4 includes a request for content from first category 402, and backend system 100 may send the requested content to output electronic device 300. Additionally, in some embodiments, backend system may determine the state of output electronic device 300 by, for example, querying output electronic device 300 with a request for its state. In some embodiments, if backend system 100 determines that output electronic device 300 is in the available state, but not the ready state, backend system 100 may first send instructions to output electronic device 300 that cause output electronic device 300 to change from the available state to the ready state (e.g., the instructions may cause media streaming device 302 to use commands under the CEC protocol to turn on peripheral video output device 304 and set peripheral video output device 304 to the input source associated with media streaming device 302) and subsequently send instructions to output electronic device 300 to cause output electronic device 300 to output the content.

In some embodiments, backend system 100 may determine that the state of output electronic device 300 is unavailable (e.g., media streaming device 302 is powered off or otherwise does not respond to a query requesting its status or that peripheral video output device 304 is not connected to media streaming device 304). If backend system 100 determines that it output electronic device 300 is unavailable, backend system 100 may generate responsive text data representing an audio message to notify individual 2 that the content cannot be played (e.g., "The content cannot be played because the associated television is not connected.") and may send the audio data to be output by voice activated electronic device 10.

Table 400 may also include a second category 404 that may include types of content that may be outputted by output electronic device 300 or voice activated electronic device 10 depending on whether output electronic device 300 is in the ready state. In the example shown in FIG. 4, second category 404 includes music, weather and audio books. In some embodiments, backend system 100 may determine that spoken command 4 includes a request for content from second category 404 and then may further determine whether output electronic device 300 is in the ready state by querying output electronic device 300 requesting its state. If backend system 100 determines that output electronic device 300 is in the ready state based on the response from output electronic device 300, backend system 100 may send instructions to output electronic device 300 to output the content from second category 404. However, if backend system 100 determines that output electronic device 300 is not in the ready state, backend system 100 may instead send content from second category 404 to voice activated electronic device 10. For example, if the requested content is the weather forecast and backend system 100 determines that the weather forecast is a type of content in the second category, backend system 100 may only send instructions to output the requested weather forecast through output electronic device 300 if output electronic device 300 is in the ready state. In some embodiments, when media streaming device 302 is powered on, but peripheral video output device 304 is powered off, output electronic device 300 will be in an available state, but not a ready state, and backend system 100 may send the weather forecast to voice activated electronic device 10, rather than output electronic device 300.

Finally, table 400 may include a third category 406 that may include types of content that may be routed primarily to voice activated electronic device 10, due to the nature and format of the content. In the example shown in FIG. 4, third category 406 includes content such as alarms and timers. Such content may be substantially audio in nature and, in particular, may be of the type that quality is less important. For example, the primary purpose of an alarm is that it be heard, at which time it is usually turned off. Accordingly, such content may be more appropriately provided via voice activated electric device 10, which can be located in closer physical proximity to individual users. In those embodiments, backend system 100 may determine that spoken command 4 includes a request for content from third category 406 and then may send the requested content to voice activated electronic device 10. Content from third category 406 should usually be sent to voice activated electronic device 10 even if voice activated electronic device 10 is associated with output electronic device 300 and output electronic device 300 is in the ready state.

Although some examples of types of content in first, second and third categories 402, 404, 406 are shown in FIG. 4, it will be appreciated by those having ordinary skill in the art that additional or different types of content may be included in table 400. Furthermore, the types of content and their division between the categories in table 400 is only an example and it will be appreciated by those having ordinary skill in the art that the types of content and their division between categories may vary from the example shown in FIG. 4 without departing from the scope of the disclosed concept. Moreover, the types of content and their division between categories may be set and changed by a user of voice activated electronic device 10. The information included in FIG. 4 may be stored on backend system 100 in, for example, content routing module 270.

In some embodiments, the state of output electronic device 300 may change while content is being output. For example, while content is being output through peripheral video output device 304, individual 2 may turn off peripheral video output device 304 causing the state of output electronic device 300 to change from ready to available. In some embodiments, output electronic device 300 may monitor and communicate any changes in its state to backend system 100. For example, media streaming device 302 may use the CEC protocol to periodically monitor whether peripheral video output device 304 has been turned off or has changed input source to determine whether the state of output electronic device 300 has changed from ready to available. Media streaming device 302 may then communicate the change in state to backend system 100. In some embodiments, backend system 100 may periodically query output electronic device 300 requesting its state. Based on the response from output electronic device 300, backend system 100 may determine whether the state of output electronic device 300 has changed. In some embodiments, backend system 100 may determine that the state of output electronic device 300 has changed from the ready state to the available or unavailable state and may stop send instructions to output electronic device 300 to stop outputting the content based on the change of state. For example, the instructions may cause media streaming device 302 to stop sending content to peripheral video output device 304. In some embodiments, backend system 100 may subsequently start sending the content to voice activated electronic device 10 when the state of output electronic device 300 changes from the ready state to the available or unavailable state.

Similarly, in some embodiments, while content is being output through voice activated electronic device 10, the state of output electronic device 300 may change from the unavailable or available state to the ready state. Backend system 100 may determine that that the state of output electronic device 300 has changed from the unavailable or available state to the ready state and may start sending the content to output electronic device 300 instead of voice activated electronic device 10. In some embodiments, upon determining that the state of output electronic device 300 has changed from the unavailable or available state to the ready state, backend system 100 may generate a prompt to inquire whether individual 2 would like to have the content output through output electronic device 300 instead of voice activated electronic device 10. In some embodiments, the prompt may be displayed as a user interface on output electronic device 300. Individual 2 may interact with the user interface to indicate whether the content should be output through output electronic device 300. Also, in some embodiments, the prompt may be output as audio through voice activated electronic device 10. Individual 2 may provide a spoken response to indicate whether the content should be output through output electronic device 300. Voice activated electronic device 10 may send audio data representing individual's 2 response to backend system 100 and backend system 100 may determine the nature of individual's 2 response and route the content accordingly (e.g., backend system 100 may send instructions to output the content through output electronic device 300 in response to individual 2 indicating that he/she would like to have the content sent to output electronic device 300).

In some embodiments, while content is being output through voice activated electronic device 10, the state of output electronic device 300 may change from the unavailable state to the available state. Backend system 100 may determine that the state of output electronic device 300 has changed from the unavailable state to the available state and may generate an audio prompt to inquire whether individual 2 would like to have the content output through output electronic device 300 instead of voice activated electronic device 10. Backend system 100 may send the audio prompt to voice activated electronic device 10 to be output as audio. Individual 2 may provide a spoken response to indicate whether the content should be output through output electronic device 300. Voice activated electronic device 10 may send audio data representing individual's 2 response to backend system 100 and backend system 100 may determine the nature of individual's 2 response and route the content accordingly. If the response indicates that individual 2 would like to send the content to output electronic device 300, backend system 100 may send instructions to output electronic device 300 that cause it to change to the ready state and output the content. Backend system 100 may also send instructions to voice activated electronic device 10 that cause it to stop outputting the content.

Furthermore, in some embodiments, individual 2 may direct content to either voice activated electronic device 10 or output electronic device 300 by specifying a target device in spoken command 4. For example, individual 2 may speak "Alexa-Play my music playlist on my TV." to voice activated electronic device 10. Backend system 100 may use STT and NLU processing to determine that individual 2 has specified the target device for the content and may send the requested content to output electronic device 300. For example, a type of output electronic device 300 (e.g., television) may be stored in data structure 102 in content routing module 270. NLU module 260 may determine that a target device is specified in command 4 and may query content routing module 270 requesting information on whether voice activated electronic device 10 is associated with output electronic device 300 and information on the type of output electronic device 300. NLU module 260 may use NLU functionality and the information on the type of output electronic device 300 to determine whether the probability that individual 2 has requested output electronic device 300 is above a predetermined threshold probability. For example, if command 4 includes a request to play the content on "my TV" and output electronic device 300 is a television, it is probable that output electronic device 300 is the requested device. However, if command 4 includes a request to play the content on "my speaker system" and output electronic device 300 is a television, it is less probably that output electronic device 300 is the requested device. If backend system 100 cannot determine the requested target device, backend system 100 may generate an audio prompt to request clarification from individual or to notify individual that the requested target device cannot be found. Backend system 100 may send the audio prompt to voice activated electronic device 10 to be output as audio to individual 2. Individual 2 may similarly request to send the content to voice activated electronic device 10 by specifying voice activated electronic device 10 as the target device. In some embodiments, backend system 100 will send the content to the explicitly requested target device even though the content type may be in a category that normally should be sent to a different device.

Figure 5:
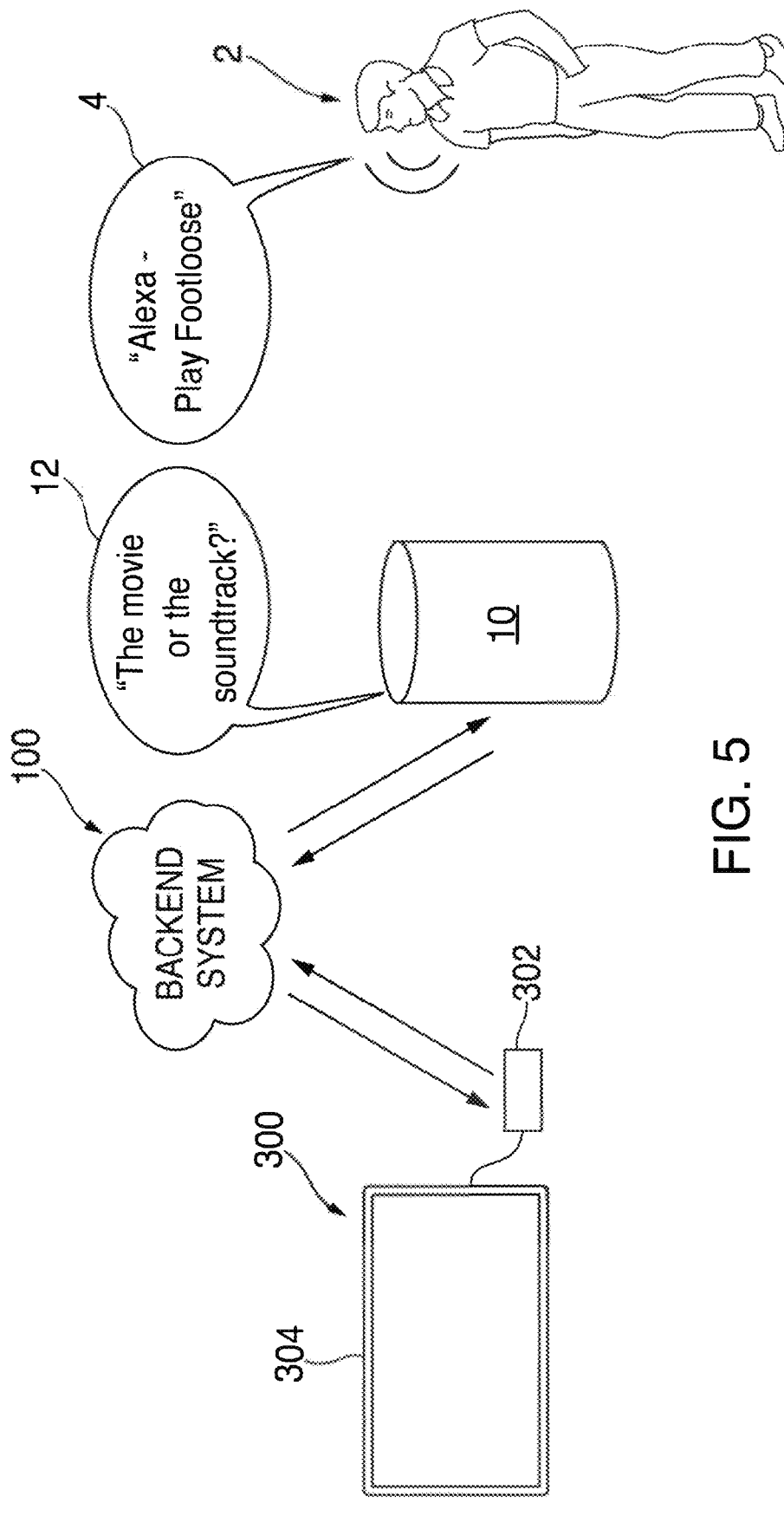
FIG. 5 is an illustrative diagram of an example of resolving an ambiguous request for content in accordance with various embodiments.

FIG. 5 is an illustrative diagram of an example of resolving an ambiguous request for content. In some embodiments of the disclosed concept, spoken command 4 may include an ambiguous request for content. For example, individual 2 may say "Alexa-Play Footloose." The request could correspond to the movie Footloose or the soundtrack for the movie Footloose. In order to resolve the ambiguity, backend system 100 may generate responsive audio data representing an audible message 12 requesting clarification of the request for content. For example, the audible message 12 may be "The movie or the soundtrack?" Individual 2 may provide a spoken response to voice activated electronic device 10. Backend system 100 may then analyze the spoken response using STT to determine which words were spoken, followed by NLU processing to determine the meaning of the spoken words and therefore, which specific content individual 2 was referring to. Upon determining which specific content individual 2 was referring to, backend system 100 may route the selected content to the appropriate one of output electronic device 300 or voice activated electronic device 10.

In some embodiments, backend system 100 may use other methods to resolve ambiguous requests for contents. For example, if spoken command 4 includes a request to play the content on a specific device, it can help to determine which content individual 2 requested. For example, if spoken command 4 is "Alexa-Play the Book Thief on my TV," backend system 100 system may determine that individual 2 is requesting the movie The Book Thief rather than the book, The Book Thief. In some embodiments, backend system 100 may also use other information included in spoken command 4 to help determine which content individual 2 requested. For example, if spoken command 4 is "Alexa-Read the Book Thief," backend system 100 may determine from the use of the term "Read," that individual 2 is requesting the book "The Book Thief" rather than the movie "The Book Thief."

Figure 6:
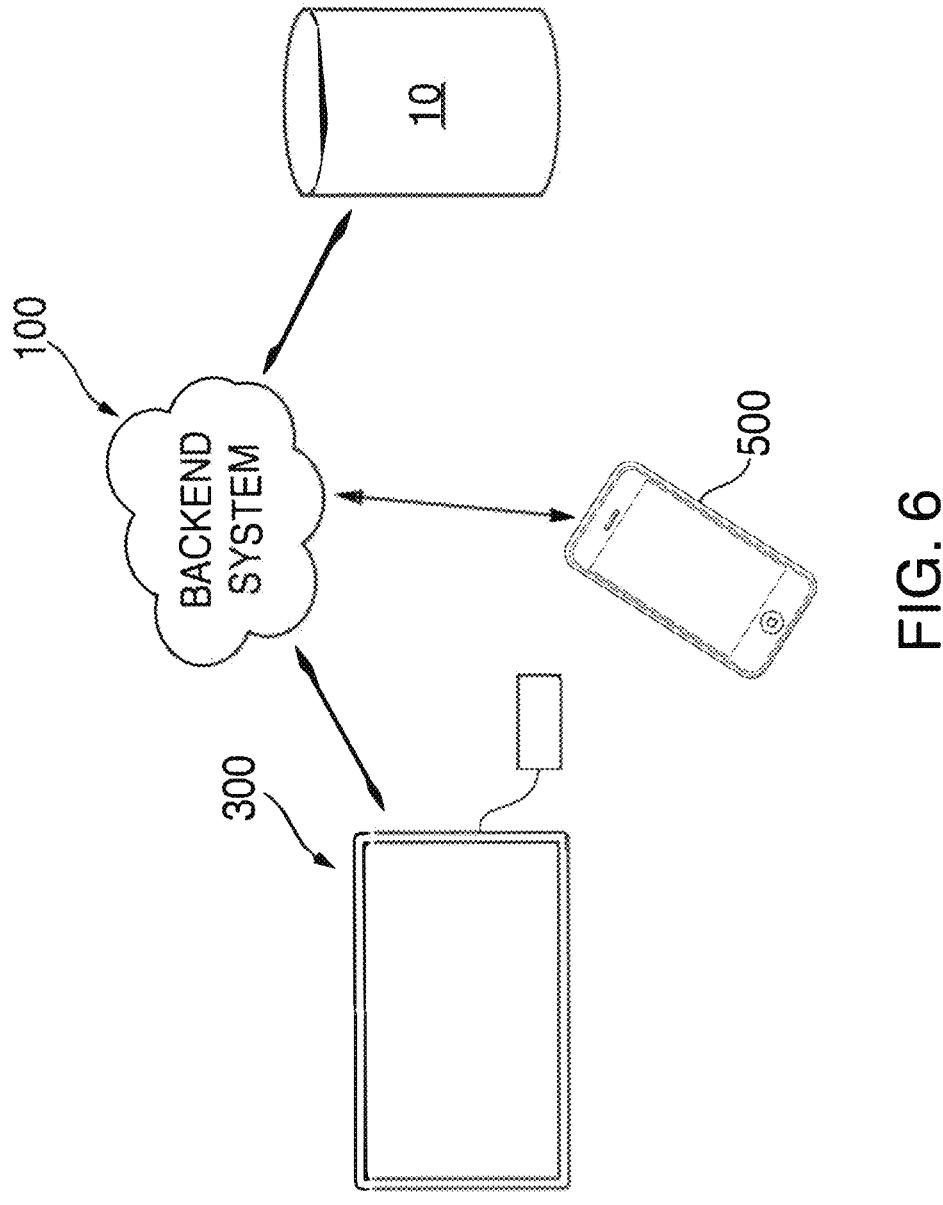
FIG. 6 is an illustrative diagram of a system for associating an output electronic device with a voice activated electronic device in accordance with various embodiments.

FIG. 6 is an illustrative diagram of a system that may be used to setup an association between voice activated electronic device 10 and output electronic device 300. In some embodiments, settings for voice activated electronic device 10 may be accessed via a user electronic device 500. User electronic device 500 may be, for example, a mobile phone, computer, tablet, or other type of electronic device. User electronic device 500 may be in communication with back-end system 100 and may include an application or other program that allows a user to setup the association between voice activated electronic device 10 and output electronic device 300. For example, a user may identify and/or select output electronic device 300 as the device associated with voice activated electronic device 10. After the association between voice activated electronic device 10 and output electronic device 300 has been setup via user electronic device 500, the association may be stored on backend system 100 in, for example, data structure 102 (see, for example, FIG. 1). In some embodiments, information on the association, such as information identifying output elec-tronic device 300 may be stored in data structure 102 which may be stored in content routing module 207 (see, for example, FIG. 3). Additional metadata indicating that voice activated electronic device 10 is associated with another device (e.g., a flag) may be stored in, for example, user accounts module 268. The additional metadata stored in user accounts module 268 may trigger backend system 100 to look to content routing module 270 to determine the identity of output electronic device 300 and to determine whether requested content should be output by output electronic device 300.

User electronic device 500 may be used to change settings associated with how backend system 100 determines where to route content. For example, user electronic device 500 may be used to specify the types of content that should always be played on output electronic device 300 and the types of content that should be played on output electronic device 300 if it is in the active state. It will be appreciated by those having ordinary skill in the art that various other settings associated with voice activated electronic device 10, backend system 100 and output electronic device 300 may be set via user electronic device 500. In some embodiments, output electronic device 300, rather than user electronic device 500, may be used to associate voice activated elec-tronic device 10 with output electronic device 300.

Once output electronic device 300 has been associated with voice activated electronic device 10, the associated may be broken or re-established via spoken commands received by voice activated electronic device 10. For example, a spoken command such as "Disconnect my TV." may be used to end the association between voice activated electronic device 10 and output electronic device 300 and a spoken command such as "Re-connect my TV." may be used to re-establish the association between voice activated elec-tronic device 10 and output electronic device 300.

Figure 7:
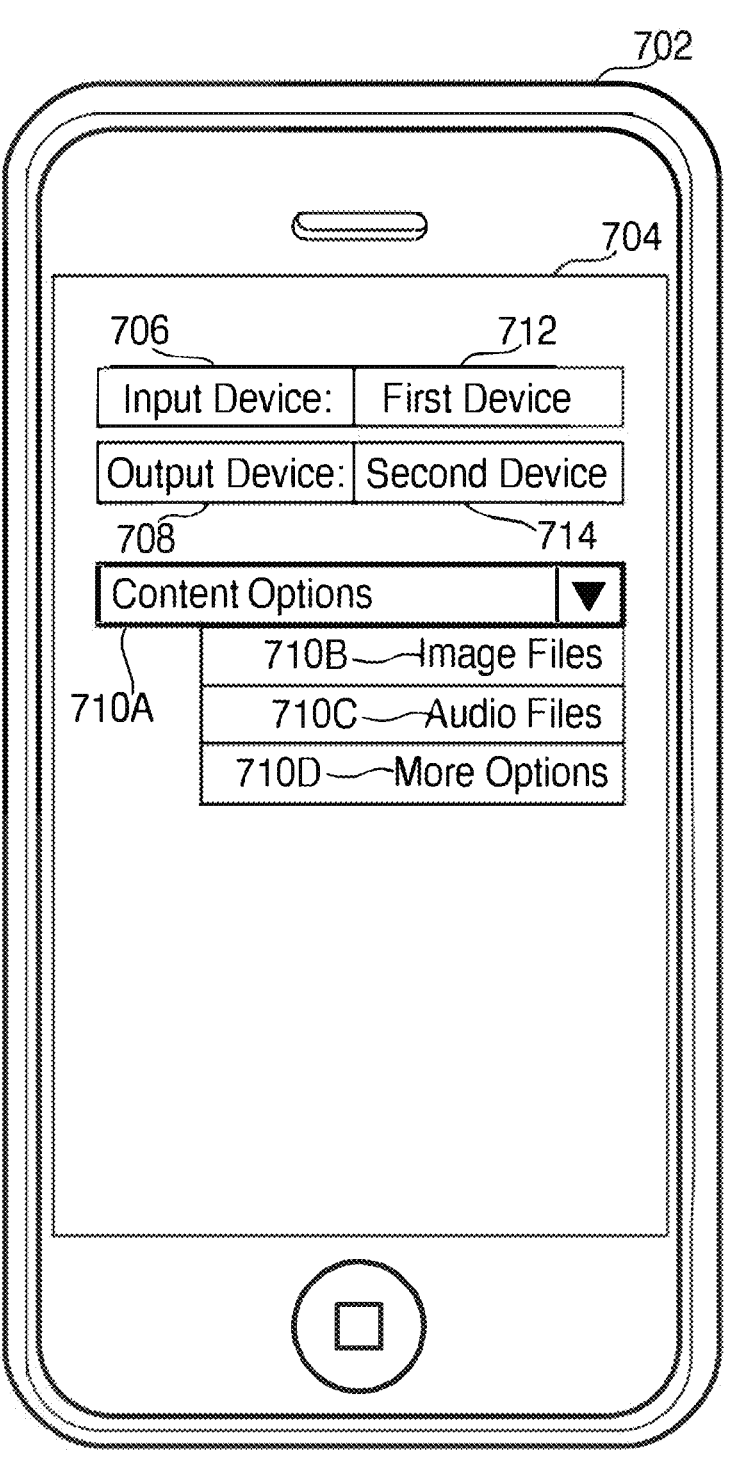
FIG. 7 is an illustrative diagram showing linking of two exemplary devices in accordance with various embodiments.

FIG. 7 is an illustrative diagram showing linking of two exemplary devices in accordance with various embodi-ments. Electronic device 702, in some embodiments, may correspond to any electronic device or system. Various types of electronic devices may include, but are not limited to, desktop computers, mobile computers (e.g., laptops, ultra-books), mobile phones, smart phones, tablets, televisions, set top boxes, smart televisions, watches, bracelets, display screens, personal digital assistants ("PDAs"), smart furni-ture, smart household devices, smart vehicles, smart trans-portation devices, and/or smart accessories. In some embodiments, electronic device 10 may be relatively simple or basic in structure such that no mechanical input option(s) (e.g., keyboard, mouse, trackpad) or touch input(s) (e.g., touchscreen, buttons) may be provided. In some embodi-ments, however, electronic device 10 may also correspond to a network of devices.

Electronic device 702 may have display screen 704. Display screen 704 may display content on electronic device 702. In some embodiments, electronic device 702 may have one or more processors, memory, communications circuitry, and an input/output interface. The one or more processors of electronic device 702 may be similar to processor(s) 202 of FIG. 3 and the same description applies. The memory of electronic device 702 may be similar to storage/memory 204 of FIG. 3 and the same description applies. The communi-cations circuitry of electronic device 702 may be similar to communications circuitry 206 of FIG. 3 and the same description applies. The input/output interface of electronic device 702 may be similar to input/output interface 212 of FIG. 3 and the same description applies. Additionally, elec-tronic device 702 may have one or more microphones. The one or more microphones of electronic device 702 may be similar to microphone(s) 208 of FIG. 3 and the same description applies. Furthermore, electronic device 702 may have one or more speakers. The one or more speakers of electronic device 702 may be similar to speaker(s) 210 of FIG. 3 and the same description applies.

In one exemplary embodiment, an individual may want to link two or more devices together by selecting a device that receives commands and another device that outputs content responsive to the received commands. While only one device for each option (receiving commands and outputting responses) is shown, persons having ordinary skill recognize that any amount of devices can be linked. In some embodi-ments, input device 706 may be selected. To select input device 706, electronic device 702 may search for devices capable of receiving inputs. In some embodiments, elec-tronic device 702 may search may for a suitable device via a web browser using HTTP. Various additional communi-cation protocols may be used to facilitate communications between voice activated electronic device 10 and backend system 100 including but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, Bit-Torrent, FTP, RTP, RTSP, SSH, and/or VOIP. Once elec-tronic device 702 has located suitable input devices, elec-tronic device 702 may list the devices on display screen 704 for an individual to select from. In the example shown in FIG. 7, the device selected is first device 712. Once first device 712 is selected as an input device, electronic device 702 may store identifiers for first device 712. First device 712, in some embodiments, may be similar to voice acti-vated device 10 and the same description applies.

To select output device 708, electronic device 702 may search for devices capable of outputting content. Similar to searching for input device 706, electronic device 702 may search may for a suitable device via a web browser using HTTP. Various additional communication protocols may be used to facilitate communications between voice activated electronic device 10 and backend system 100 including but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP. Once electronic device 702 has located suitable output devices, electronic device 702 may list the devices on display screen 704 for an individual to select from. The devices listed may be based on selected content options 710A. A more detailed description of content options 710A is shown below. In the example shown in FIG. 7, the output device selected is second device 714. Once second device 714 is selected as an output device, electronic device 702 may store identifiers for second device 714.

An individual may also select the type of content that will be sent to output device 708. In some embodiments, the individual may select from a drop down menu. Content options 710A may contain a variety of options. The first option, in some embodiments, may be image files 710B. This content option, if selected, may send any image files requested by first device 712 to second device 714. Image data may include any content that includes visual information, including, but not limited to, videos, movies, photos, presentations, or any other display that is visual. For example, if an individual states "Alexa, play the movie," to first device 712, the movie would be played by second device 714. The second option, in some embodiments, may be audio files 710C. Audio files may include any type of content that contains audio data. This content option, if selected, may send any audio files requested by first device 712 to second device 714. For example, if an individual states "Alexa, play the song," to first device 712, the song would be played by second device 714. The third option, more options 710D, may be any type of content. More options 710D may be specific to a specific request. For example, more options 710D may be weather forecasts. In this embodiment, if an individual states "Alexa, give me the weather forecast," to first device 712, the weather forecast would be output on second device 714. As another example, more options 710D may be news updates. In this embodiment, if an individual states "Alexa, tell me the news," to first device 712, the news would be output on second device 714. In some embodiments, multiple options may be selected. For example, image files 710B and audio files 710C may be selected. In this example, if first device receives 712 a request for either audio files or image files, the content would be sent to second device 714. While only a few types of contents are shown in FIG. 7, persons of ordinary skill recognize that this is for exemplary purposes only and any type or number of types may be selected in content options 710A.

In some embodiments, electronic device 702 can communicate with backend system 100. If so, electronic device 702 may send first device 712 identifiers to backend system 100. Additionally, electronic device 702 may send second device 714 identifiers to the backend system. Furthermore, electronic device 702 may content options 710A identifiers to the backend system. The identifiers may be stored using user account 268 of FIG. 3 and the same description applies. Backend system 100 may then store the link between first device 712 and second device 714 such that when the type of content selected in content options 710A is requested by first device 712, the requested content is sent to second device 714. If no content type is selected under content options 710A by an individual, the backend system may send content requested by first device 712 to second device 714 that can be outputted by second device 714.

In some embodiments, there might be multiple input devices for output device 708. In another embodiment, there might be multiple output devices for input device 706. In another embodiment, there might be primary and secondary output devices for input device 706. In this embodiment, requests for content to be routed from input device 706 to output device 708 would be routed to the primary output device. If the primary output device is not able to receive content, the content may be routed to the secondary output device.

FIG. 8 is an illustrative flowchart of a process 1000 sending content to an associated device in accordance with various embodiments. Process 1000 may be implemented in, for example, backend system 100 and the same description applies herein. In some embodiments, process 1000 may begin at step 1002. At step 1002, backend system 100 may receive first audio data from a first electronic device. The first electronic device of process 1000, may, in some embodiments, be voice activated device 10 of FIGS. 1-3 and 5-6 and the same descriptions apply. The first audio data may represent spoken command 4 from individual 2 and may include a request for content such as, for example, a request for the weather forecast. For example, if individual 2, stated "Alexa, what is the weather forecast," the voice activated electronic device may record the stated phrase and send the audio data to the backend system. The first audio data may be received by the voice activated electronic device using one or more of the microphones on the voice activated electronic device. The one or more microphones on the voice activated device may be similar to microphone(s) 208 of FIG. 3 and the same description applies.

At step 1004, backend system 100 may determine that there is a user account associated with the first electronic device. In some embodiments, the backend system may receive an identifier associated with the voice activated electronic device. This data may come in the form of a customer identifier, product number, IP address, GPS location, or any other suitable method of identifying the voice activated electronic device. The backend system may then search for, and identify a user account associated with the identifier. The user account may be any suitable number or identifier that can identify a user associated with the voice activated electronic device.

In some embodiments, once the backend system has determined a first user account associated with the first electronic device, the backend system may find a stored association between two electronic devices. In some embodiments, the backend system may find that the first electronic device is an input device in the stored association between two electronic devices. The response to the received first audio data may be routed based on a stored association. A further description of routing content based on a stored association is in FIG. 9A below.

At step 1006, the backend system may generate first text data representing the first audio data received from the voice activated electronic device. The text data may be generated by executing STT functionality on the received first audio data. The STT functionality may be used to determine the individual words within the received first audio data. The STT functionality of process 1000 may be accomplished by using Automatic Speech Recognition 258 shown in FIG. 3. The same disclosure of FIG. 3 applies here. More particularly, step 1006 may be accomplished by using Speech-To-Text 266 within Automatic Speech Recognition 258 and the same disclosure applies. Continuing the example, once the backend system received audio data stating "Alexa, what is the weather forecast," Automatic Speech Recognition 258 would execute STT functionality on the audio data. This would create text data representing "Alexa, what is the weather forecast."

At step 1008, backend system 100 may determine the intent of the first text data. After the back-end system has generated the first text data representing the first audio data, the text data would be sent to NLU for processing. The NLU receives the first text data in order to determine the intent of the first text data. The NLU described herein may be accomplished by using Natural Language Understanding 260 of FIG. 3. The same disclosure for FIG. 3 applies herein. Continuing the example, the NLU receives text data representing the audio data stating "Alexa, what is the weather forecast." The NLU may recognize that "Alexa" is the wakeword, and therefore not relevant to determining the intent of the received audio data. The NLU may then break apart and analyze the phrase or utterance "what is the weather forecast." First, the NLU may analyze the verb in the utterance, "what." This would allow the NLU to better understand the intent of the utterance. Next, the NLU may break up the remaining phrase "is the weather forecast," into "is the" and "weather forecast." This also allows the NLU to better understand the intent of the utterance. With the phrase broken up and analyzed, the NLU may then search the backend system for a list of possible requests, assigning each a confidence score. A confidence score, as used herein, may be any identifier that may be assigned, allowing a system to rank possible matches of data. The confidence score may then be compared to a predetermined threshold in order to determine whether a possible intent is a match. Confidence scores and predetermined thresholds are explained in more detail below in the description of FIG. 8. In step 1008, the NLU may determine that the intent of the first text data is to find the weather forecast. Because a location is not stated within the first audio data, the NLU may also determine that the weather forecast should be within the geographic area of the voice activated electronic device. The geographic area of the voice activated electronic device may come from data sent by the voice activated electronic device.

If the NLU cannot find a request within the backend system's database that meets or exceeds a predetermined threshold, the backend system may generate apologetic text data. The backend system may then receive audio data representing the apologetic text data by executing STT functionality on the apologetic text data. The backend system may send the audio data to the voice activated electronic device. The voice activated electronic device would then play the audio data on one or more of its speakers. For example, if the NLU could not find a suitable match to the request, the voice activated device may say, "I am sorry, I did not understand the request."

Alternatively, if the NLU finds more than one suitable match, the backend system may generate a confirmation. The confirmation may help the NLU to make a decision between more than one suitable match. This situation is described in more detail below in the description of FIGS. 9A, 9B, and 9C.

At step 1010, the backend system determines a second electronic device is also associated with the user account. After identifying a user account associated with the identifier, the backend system may then search for any additional devices associated with the user account. The device may be any device capable of communicating with a cloud-based backend system. The device can be, but is not limited to a television, a computer, a laptop, a personal digital assistant (PDA), and any device that may be connected to the internet or any device that may be connected to another device via a Bluetooth connection. While some devices have been listed, persons having ordinary skill in the art recognize that any device that can be connected to another device can be used. Furthermore, the second electronic device associated with the user account in process 1000 may be output electronic device 300 of FIGS. 1-3 and 5-6. The disclosure of output electronic device 300 applies equally to the device associated with the voice activated electronic device herein.

At step 1012, the backend system determines that the response to the first audio data will be audio and visual. Continuing the example, when the NLU determines that the intent of the first text data is to determine a weather forecast, the backend system may access a weather category server. The weather category server may be similar to, or within, Category Server/Skills 262 of FIG. 3 and the same descriptions applies herein. The weather category server may have information relating to the weather of the location of the voice activated electronic device. Within the memory of the weather category server, there might be different categories of data. The different categories of data described herein might be similar to the categories shown in FIG. 4 and the same descriptions apply. The memory of the weather category server might have text data representing responses to requests for weather. Additionally, the weather category memory may have video data responsive to requests for weather. If the weather category memory finds video data responsive to the request for weather, the backend system may check to see if the associated device is capable of displaying video data. Because the backend system has already determined that a device is associated with the electronic device, the backend system may look for both audio and video data responsive to the first audio data from the voice activated electronic device. For example, audio data responsive to the request for a weather forecast might contain a statement having the high and low temperatures the day along with other various weather conditions. The visual data may be a five-day weather forecast that can be displayed on a screen of an associated device.

At step 1014, the backend system determines that a response is to be sent to the first electronic device. Once responsive audio data is found, the backend system determines that an answer to the first audio data is to be sent to the first electronic device. In some embodiments, this determination is so the backend system is ready to send audio data to the first electronic device. Continuing the example, the backend system now determines that a response to the request for a weather forecast will be sent to the first electronic device.

At step 1016, the backend system determines that a response is to be sent to the second electronic device. If the backend system determines that the second electronic device can display visual data, in some embodiments, at step 1016, the backend system determines that both an audio response and a video response will be sent to the second electronic device. In some embodiments, because a visual response is going to be played on the second electronic device, the audio response being sent to the voice activated electronic device may simply be a signal that a visual response will be displayed on the second electronic device. Continuing the example, the backend system now determines that a response to the request for a weather forecast will be shown on the associated device. Furthermore, the response from the voice activated device may state "Your weather forecast is being displayed on your television."

At step 1018, the backend system receives second text data representing a first audio response. In some embodiments, the text data received by the backend system will come from a category server or skills server. The category server or skills server may be the same as, or within Category Servers/Skills 262 of FIG. 3 and the same description applies. In some embodiments, the second text data may be an entire response to the first audio data received from the voice activated electronic device. For example, in response to a request for news, the text data may contain the news for the day. If there is a visual data and a second electronic device capable of displaying the visual data, in some embodiments the second text may be an indication of where the response will be played. For example, in response to a news request, the text data may indicate that the response will be shown on a television. Continuing the weather forecast example, the weather category server will send text data representing the response to the backend-system. The text data may have text indicating the weather forecast will be played on the television.

At step 1020, the backend system generates second audio data representing the second text data. Once the text data has been received from a category server or a skills server, that text data is converted into audio data. The data is converted into audio data by executing TTS functionality on the text data. The TTS functionality may be similar to Text-To-Speech 264 of FIG. 3, and the same description applies. Continuing the weather forecast example, if the text data received by the weather category server contains a full audio response, the audio data may state "The weather forecast in Seattle has a high of 72 degrees and a low of 55 degrees with a chance of showers." If the text data is merely an indication that the visual data will be played on the second electronic device, the audio data may state "The weather forecast in Seattle is on your television."

At step 1022, the backend system sends the second audio data to the first electronic device. The second audio data, created executing TTS functionality on the second text data, is transmitted to the first electronic device. Once the second audio data is sent to the first, the second audio data is output by one or more of the speakers on the first electronic device. The one or more speakers is similar to speaker(s) 210 of FIG. 3 and the same description applies. Continuing the weather forecast example, if the audio data contains a full audio response, the first electronic device may play "The weather forecast in Seattle has a high of 72 degrees and a low of 55 degrees with a chance of showers." If audio data is merely an indication that the visual data will be played on the second electronic device, the first electronic device may play "The weather forecast in Seattle is on your television."

At step 1024, the backend system receives third text data representing a second audio response. In some embodiments, the third text data received by the backend system will come from a category server or skills server. The category server or skills server may be the same as, or within Category Servers/Skills 262 of FIG. 3 and the same description applies. In some embodiments, the third text data may be an entire response to the first audio data received from the first electronic device. For example, in response to a request for a commute, the text data may contain the traffic report. If there is a visual data and the second electronic device is capable of outputting visual data, in some embodiments the third text may be an indication of the response that will be shown on the second electronic device. For example, in response to a news request, the text data may indicate that the response will be shown on a television. Continuing the weather forecast example, as with the second text data, the backend system will receive third text data representing the response to the first audio data from the weather category server. The third text data may have text indicating the weather forecast is being shown on the television.

At step 1026, the backend system receives third audio data representing the third text data. Once the third text data has been received from a category server or a skills server, the third text data is converted into audio data. The data is converted into audio data by executing TTS functionality on the third text data. The TTS functionality may be similar to Text-To-Speech 264 of FIG. 3, and the same description applies. Continuing the weather forecast example, if the third text data received by the weather category server contains a full audio response, the audio data may state "The weather forecast in Seattle has a high of 72 degrees and a low of 55 degrees with a chance of showers." If the third text data is merely an indication that the visual data will be played on the second electronic device, the audio data may state "Here is the weather forecast in Seattle."

At step 1028, the backend system receives image data representing a video response. Image data, as described herein, may be any visual information, including, but not limited to, movies, videos, photos and presentations. Once the backend system determines that the second electronic device is capable of displaying video content, the backend system will look to send visual data responsive to the first audio data from category servers or skill servers to the second electronic device. The category server or skills server may be the same as, or within Category Servers/Skills 262 of FIG. 3 and the same description applies. The video content may be part of a category of data within a category server or skill server. This category may be similar to Only Play on Output Device 402 of FIG. 4 and the same description applies. Output device, in some embodiments, may refer to a device capable of outputting video data such as the associated device of process 1000 or output electronic device 300 of FIG. 3. Second electronic device of process 1000 may be similar to output electronic device 300 of FIG. 3 and the same description applies. Continuing the weather forecast example, the backend system may receive visual data of a weather forecast.

At step 1030, the backend system sends third audio data to the second electronic device. The third audio data, created executing TTS functionality on the third text data, is sent to the associated device. Once the third audio data is sent to the second electronic device, the third audio data is output by one or more of the speakers on the second electronic device. The one or more speakers are similar to speakers 314 of FIG. 3 and the same description applies. Continuing the weather forecast example, if the audio data contains a full audio response, the second electronic device may play "The weather forecast in Seattle has a high of 72 degrees and a low of 55 degrees with a chance of showers." If audio data is merely an indication that the visual data will be played on the second electronic device, the one or more speakers of the second electronic device may play "Here is the weather forecast in Seattle."

At step 1032, the backend system sends video data to the second electronic device. The video data, received from a category server or a skills server, is transmitted to the second electronic device. The video data may then be played or shown by the second electronic device on a display screen of the associated device. The display screen of the second electronic device may be similar to display 312 of FIG. 3 and the same description applies.

Figure 9A:
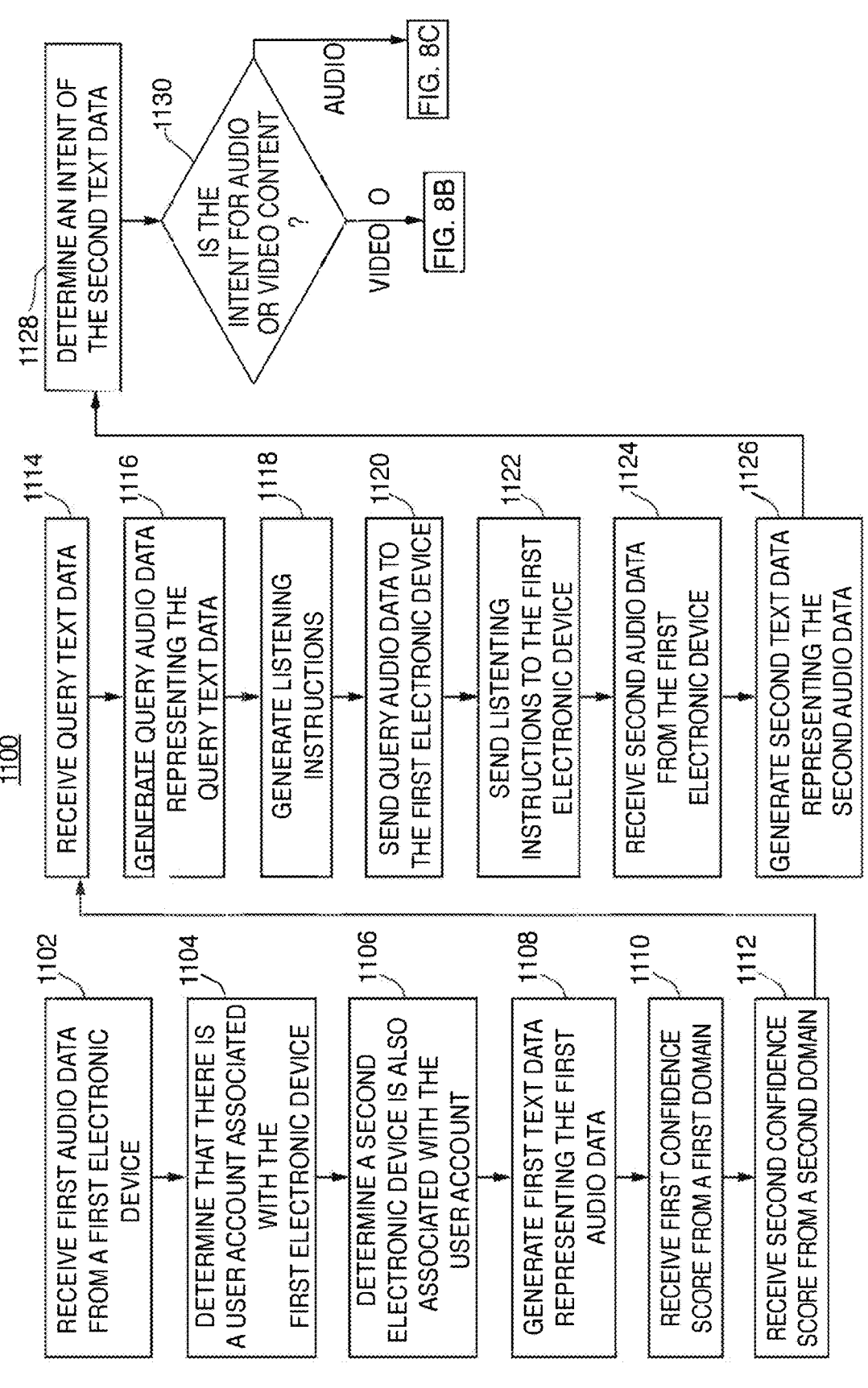
FIG. 9A is an illustrative flowchart of a process for routing content based on the type of content in accordance with various embodiments.

FIG. 9A is an illustrative flowchart of process 1100 for routing content based on the type of content in accordance with various embodiments. Process 1100, as with process 1000, may be implemented in, for example, backend system 100 and the same description applies herein. In some embodiments, process 1100 may begin at step 1102. At step 1102, backend system 100 may receive first audio data from a voice activated electronic device. Step 1102 may be similar to step 1002 of process 1000 and the same description applies. The voice activated electronic device of process

1100, may, in some embodiments, be voice activated device 10 of FIGS. 1-3 and 5-6 and the same descriptions apply. The first audio data may represent an utterance spoken by an individual and may include a request. For example, if an individual stated "Alexa, play Footloose," the voice activated electronic device may record the stated phrase and send the audio data to the backend system. The first audio data may be received by the voice activated electronic device using one or more of the microphones on the voice activated electronic device. The one or more microphones on the voice activated device may be similar to microphone(s) 208 of FIG. 3 and the same description applies.

At step 1104, backend system 100 may determine that there is a user account associated with the first electronic device. Step 1104, in some embodiments, may be substantially similar to step 1004 of process 1000 and the same description applies. In some embodiments, the backend system may receive an identifier associated with the voice activated electronic device. The backend system may then search for, and identify a user account associated with the identifier. The user account may be any suitable number or identifier that can identify a user associated with the voice activated electronic device.

At step 1106, the backend system may determine a second electronic device is also associated with the user account. After a user account associated with the identifier is identified, the backend system may then search for any additional devices associated with the user account. In some embodiments, the backend system may find that a second electronic device is also associated with the user account. The second electronic device may be similar to the second electronic device of process 1000 and the same description applies. Additionally, the second electronic device associated with the user account described in process 1100 may be output electronic device 300 of FIGS. 1-3 and 5-6. The disclosure of output electronic device 300 applies equally to the device associated with the voice activated electronic device in process 1100. For example, the second electronic device also associated with the user account may be a television.

At step 1108, the backend system may generate first text data representing the first audio data received from the voice activated electronic device. Step 1106 may be similar to step 1006 of process 1000 and the same description applies. The text data may be generated by executing STT functionality on the received first audio data. The STT functionality of process 1100 may be accomplished by using Automatic Speech Recognition 258 shown in FIG. 3. The disclosure of Automatic Speech Recognition 258 of FIG. 3 and Speech-To-Text 266 of FIG. 3 applies here. Continuing the example, once the backend system received audio data stating "Alexa, play Footloose," Automatic Speech Recognition 258 may execute STT functionality on the audio data. This would create text data representing the received audio.

At step 1110, the backend system receives a first confidence score from a first domain. The backend system at step 1110 may use NLU functionality in a similar manner as step 1008 of process 1000 and the same description applies. The NLU described in process 1100 may be similar to Natural Language Understanding 260 of FIG. 3 and the same description applies. A first domain may refer to any server or servers located within or connected to the backend system. A domain may be similar to or within Category Servers/Skills 262 of FIG. 3 and the same description applies. Similarly to step 1008 of process 1000, the NLU may break up the phrase "Alexa, play Footloose." The NLU may recognize the wakeword and focus on the verb and noun of the utterance "Alexa, play Footloose." The verb in the utterance would be "play." Play can refer to, among other types of content, a song and a movie. While only song and movie are disclosed herein, persons having ordinary skill in the art recognize that any content may be used. While play may not have narrowed down correct responses, the NLU will look to the noun to see if the possibilities may be narrowed down. The NLU may analyze "Footloose" by searching category servers or skill servers to determine what kind of content "Footloose" may be related to. A song category server may send a confidence score to the NLU indicating that that there is a high likelihood that the first audio was requesting the song footloose to be played. The confidence score assigned may be a function of how likely a response from a domain is the correct response. As the NLU searches for matches, it assigns values to possible responses.

Because the NLU may determine that there is a high likelihood that the utterance "play Footloose" refers to playing the song Footloose on the first electronic device, the confidence score referring to the song Footloose may exceed a predetermined threshold. In order to determine which response is correct, a predetermined threshold may be set. The predetermined threshold may ensure that incorrect responses to utterances are not sent back to the voice activated electronic device. Additionally, a predetermined threshold may help ensure that multiple irrelevant responses are not selected. This may help get faster, more accurate responses to utterances received by the first electronic device.

At step 1112, the backend system receives a second confidence score from a second domain. The backend system at step 1112 may use NLU functionality in a similar manner as step 1008 of process 1000 and the same description applies. A second domain may refer to any server or servers located within or connected to the backend system. The second domain may be substantially similar to the first domain of step 1110, and the same description applies. The backend system may receive a second intent has a confidence score greater than the predetermined threshold. Continuing the Footloose example, the NLU may also receive a confidence score from a domain indicating the first audio may have requested a video response. The NLU may only be searching for video data if the backend system has confirmed that the second electronic device is capable of outputting video data. If the backend system determines that the second electronic device is capable of outputting video data, the NLU may then receive confidence scores from category servers or skill servers for both audio content and video content. Because "play Footloose" may also be referring to playing Footloose the movie, the NLU may receive a confidence score exceeding a predetermined threshold indicating that there is a high likelihood that the utterance refers to playing the movie Footloose on the associated device. The NLU may also determine that a trailer for the movie Footloose and other responses might have a confidence score greater than a predetermined threshold. However, for simplicity purposes, only two different types of intents are shown in this example. Because in this embodiment the NLU thinks there is a high likelihood the utterance is requesting the song Footloose and the movie Footloose, the NLU determine that more information is required to accurately respond to the first audio data.

At step 1114, the backend system receives query text data. Because two confidence scores have been received indicating that either response may be correct, the backend system may determine that more information is necessary. If the backend system determines more information is necessary, the backend system may generate query text. This query text can represent a question, asking which response is correct. For example, the query text can represent a question asking whether "play Footloose" refers to Footloose the song or Footloose the movie.

At step 1116, the backend system generates query audio data representing the query text data. Once the query text data has been received by the backend system, the query text data is converted into audio data. The query text data is converted into audio data by executing TTS functionality on the query text data. The TTS functionality may be similar to Text-To-Speech 264 of FIG. 3, and the same description applies. For example, the query audio data may state, "Did you mean Footloose the song or Footloose the movie?"

At step 1118, the backend system generates listening instructions. Before sending the query, the backend system may generate listening instructions for the first electronic device. The listening instructions may direct the first electronic device to record a response to the query and send that response to the backend system. In some embodiments, the listening instructions direct the first electronic device to record without waiting for a wakeword.

At step 1120, the backend system sends the query audio data to the first electronic device. The query audio data, created executing TTS functionality on the query text data, may be transmitted to the first electronic device. Once the query audio data is sent to the first electronic device, the query audio data is output by one or more of the speakers on the first electronic device. The one or more speakers is similar to speaker(s) 210 of FIG. 3 and the same description applies. For example, the first electronic device may play, "Did you mean Footloose the song or Footloose the movie?"

At step 1122, the backend system sends the listening instructions to the first electronic device. After sending the query, the backend system may send the listening instructions to the first electronic device. The listening instructions may direct the first electronic device to record the response to the query and send audio data representing the response to the backend system.

At step 1124, the backend system receives second audio data from the first electronic device. In some embodiments, the first electronic device may receive second audio data representing a response to the query audio data. For example, the second audio may be "the movie." As another example, the second audio may be "the song."

At step 1126, the backend system generates second text data representing the second audio data. Once the second audio data is received the second audio data may then be converted into text data by executing STT functionality on the second audio data. This may be similar to step 1006 of process 1000 and step 1106 of process 1100, the same descriptions apply. The STT functionality may be accomplished by using Automatic Speech Recognition 258 shown in FIG. 3. The disclosure of Automatic Speech Recognition 258 of FIG. 3 and Speech-To-Text 266 of FIG. 3 applies here. Continuing the example, once the backend system received audio data stating either "the movie," or "the song," Automatic Speech Recognition 258 may execute STT functionality on the audio data. This would create text data representing the received audio.

At step 1128, the backend system determines an intent of the second text data. Once the second text data is generated by the backend system, the second text data may then be analyzed by the NLU. The NLU described may be similar to Natural Language Understanding 260 of FIG. 3 and the same description applies. In this example, the NLU may just be looking for a noun. Because the NLU has already determined the verb is play, the confusion is as to whether play is referring to the movie Footloose or the song Footloose. Therefore, the NLU may only analyze a noun from the second text data representing the second audio data. At step 1130, the NLU determines whether audio data or video data is to be played. The NLU may determine that the second audio data requested the movie Footloose. This situation is continued in FIG. 9B. The NLU may also determine that the second audio data requested the song Footloose. This situation is continued in FIG. 9C. Furthermore, the NLU might determine that the second audio data was either unresponsive to the query or a negative response. In this situation, the NLU may signal to the backend system that the process should stop entirely.

FIG. 9B is an illustrative flowchart continuing the process in FIG. 9A where the content is routed to an associated device based on the content in accordance with various embodiments. At step 1132B, the backend system determines the second electronic device will output the video content. If the NLU determines that the intent of the second audio data is to play video data, the NLU may determine the target device for the video data is the second electronic device. In some embodiments, this may occur because the backend system determines that the second electronic device is capable of outputting video data. In some embodiments, the backend system might base this determination on whether the first electronic device can output video data. In some embodiments, the NLU may determine that the target device is the second electronic device because the first electronic device cannot output video data and the second electronic device can output video data. The capabilities of the first electronic device and the second electronic device may be stored on the backend system. Additionally, the capabilities may be determined by generating and sending a request for capability information to the first and/or second electronic devices. The electronic devices may send responses to the requests for information indicating what type of data the electronic devices can output. In some embodiments, the backend system may send test content to the first and second electronic devices. In some embodiments, the test content may be specifically for determining the capabilities of the first and second electronic devices and may not be output by the first and second electronic devices. For example, if the second electronic device is a television, the requests for information or test content may indicate that the second electronic device can output video data. If the first electronic device is voice activated device 10 of FIG. 1, the response to requests for information or test content may indicate that the first electronic device cannot output video data. Furthermore, the NLU may determine the target device if the second audio data indicates the target device. For example, the second audio data may represent a response stating "play the movie on my television."

At step 1134B, the backend system determines that the user account is capable of accessing the video content. Once the backend system determines the second electronic device is going to play the video content, the backend system may search for the requested video content in a category that is accessible by the user account. The user account may be associated with an account that has access to a plurality of movies and songs. If the user account has access to a plurality of movies, the user account will look for the requested video content within accessible movies. In some embodiments, the user account will have access to the requested video content. In some embodiments, the user account will not have access to the requested movie. If the user account does not have access to the requested content, the backend system may search for a preview of the requested content. Furthermore, if the user account does not have access to the requested content, the backend system may receive a notification message stating that the content is unavailable. This notification message may then be converted to audio data by executing TTS functionality on the notification message. The audio data may then be sent to the first electronic device or the second electronic device to be output on one or more speakers on the first electronic device or second electronic device.

At step 1136B, the backend system generates a URL that allows the second electronic device to stream the video content. Once the backend system determines that the user account has access to the video content, the backend system may generate a URL. This URL may allow the second electronic device to stream the video content requested by the first audio data and confirmed by the second audio data. In some embodiments, once the backend system generates the URL, the backend system may generate text representing a confirmation message. The confirmation message may signal that the first electronic device understood the second audio data. This text would then be converted into audio by executing TTS functionality. The confirmation message may then be sent to the first electronic device. The first electronic device may then output the confirmation message using one or more speakers. For example, the first electronic device may state, "Ok."

At step 1138B, the backend system sends the URL to the second electronic device. The URL, generated by the backend system, may then be transmitted from the backend system to the second electronic device. The video data may then be played by speakers on the second electronic device and shown by the second electronic device on a display screen of the second electronic device. The speakers of the second electronic device may be similar to speakers 314 of FIG. 3 and the same description applies. The display screen of the second electronic device may be similar to display 312 of FIG. 3 and the same description applies. In some embodiments, the backend system may generate text representing a confirmation message. This text would then be converted into audio by executing TTS functionality. The confirmation message might be sent to the first electronic device. The first electronic device may then output the confirmation message using one or more speakers. For example, the first electronic device may state, "Your movie is starting on your television."

FIG. 9C is an illustrative flowchart continuing the process in FIG. 9A where the content is routed to an electronic device based on the content in accordance with various embodiments. At step 1132C, the backend system determines the first electronic device will output the audio content. If the NLU determines that the intent of the second audio data is to play audio data, the NLU may determine the target device for the audio data is the first electronic device. This determination may happen in a similar manner to step 1132B of FIG. 9B and the same description applies. In some embodiments, both the first electronic device and the second electronic device may be capable of outputting audio data. In this scenario, the backend system may determine that the first electronic device is the target device because it is the default device for playing audio data. Furthermore, the backend system may want more information to make the determination between devices. This information may be found in a similar manner to steps 1114 through 1128 of process 1100. In some embodiments, the NLU may determine the target device if the second audio data indicates the target device.

At step 1134C, the backend system determines that the user account is capable of accessing the audio content. Once the backend system determines the first electronic device is going to play the song, the backend system may search for the requested audio content in a category that is accessible by the user account. The user account may be associated with an account that has access to a plurality of movies and songs. If the user account has access to a plurality of songs, the user account will look for the requested audio content within accessible songs. In some embodiments, the user account will have access to the requested song. In some embodiments, the user account will not have access to the requested song. If the user account does not have access to the requested content, the backend system may search for a preview of the requested content. Furthermore, if the user account does not have access to the requested content, the backend system may receive a notification message stating that the content is unavailable. This notification message may then be converted to audio data by executing TTS functionality on the notification message. The audio data may then be sent to the first electronic device or the second electronic device to be output on one or more speakers on the first electronic device or second electronic device.

At step 1136C, the backend system generates a URL that allows the first electronic device to stream the audio content. Once the backend system determines that the user account has access to the audio content, the backend system may generate a URL. This URL may allow the first electronic device to stream the audio content requested by the first audio data and confirmed by the second audio data. In some embodiments, once the backend system generates the URL, the backend system may generate text representing a confirmation message. The confirmation message may signal that the first electronic device understood the second audio data. This text would then be converted into audio by executing TTS functionality. The confirmation message may then be sent to the first electronic device. The first electronic device may then output the confirmation message using one or more speakers. For example, the first electronic device may state, "Ok."

At step 1138C, the backend system sends the URL to the first electronic device. The URL, generated by the backend system, may then be transmitted from the backend system to the first electronic device. The audio data may then be played or streamed by the first electronic device by one or more microphones on the voice activated electronic device. The one or more microphones on the first electronic device may be similar to microphone(s) 208 of FIG. 3 and the same description applies. In some embodiments, the backend system may generate text representing a confirmation message. This text would then be converted into audio by executing TTS functionality. The confirmation message might be sent to the first electronic device. The first electronic device may then output the confirmation message using one or more speakers. For example, the voice activated electronic device may state, "Playing song Footloose."

Figure 10:
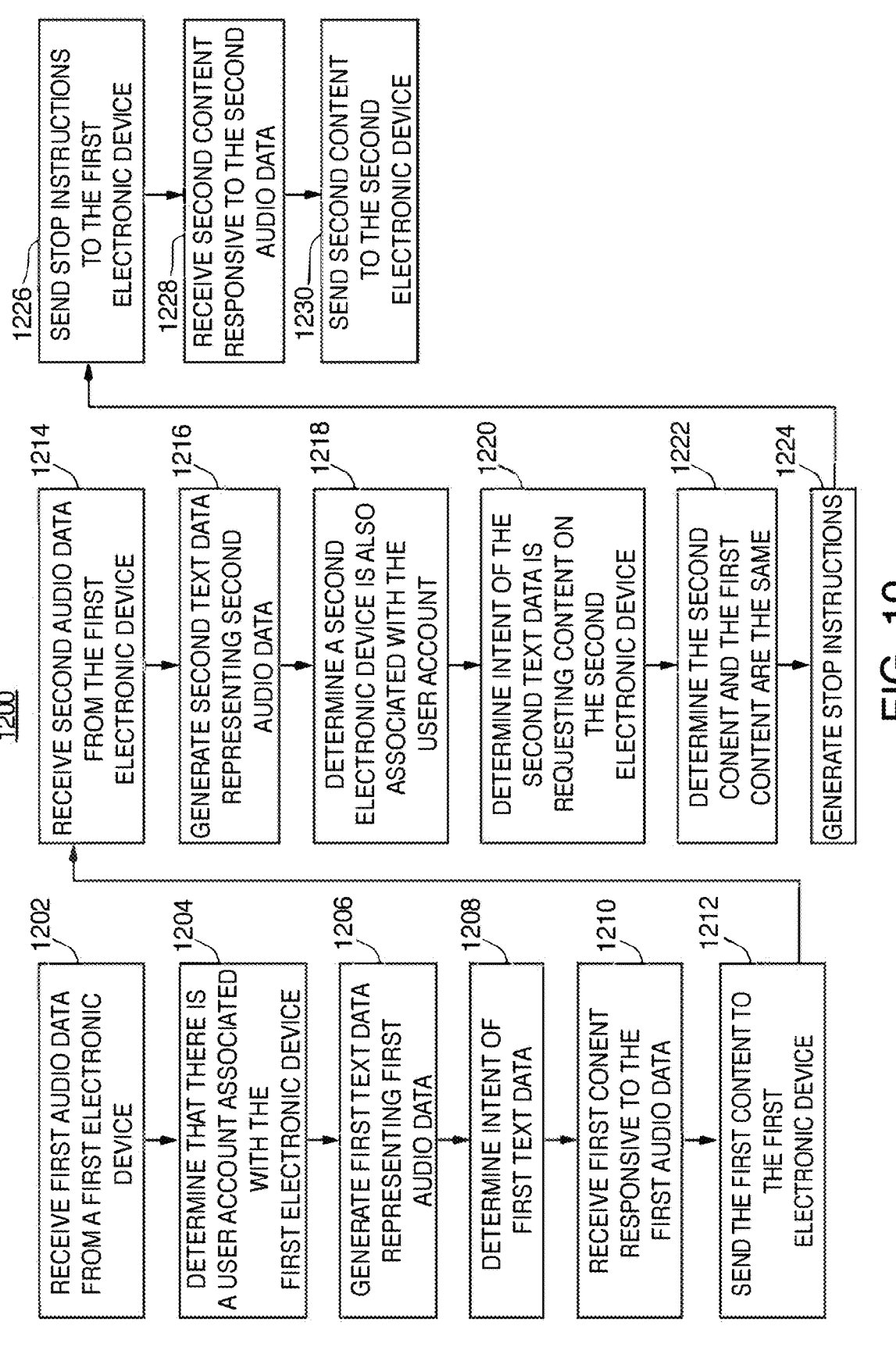
FIG. 10 is an illustrative flowchart of a process for receiving a request to change the output device in accordance with various embodiments.

FIG. 10 is an illustrative flowchart of process 1200 for receiving a request to change the output device in accordance with various embodiments. Process 1200, as with process 1100, may be implemented in, for example, backend system 100 and the same description applies herein. In some embodiments, process 1200 may begin at step 1202. At step 1202, backend system 100 may receive first audio data from a first electronic device. Step 1202 may be similar to step 1002 of process 1000 and the same description applies. The first electronic device of process 1200, may, in some embodiments, be voice activated device 10 of FIGS. 1-3 and 5-6 and the same descriptions apply. The first audio data may represent an utterance spoken by an individual and may include a request. For example, if an individual stated "Alexa, play Content," the voice activated electronic device may record the stated phrase and send the audio data to the backend system. The first audio data may be received by the voice activated electronic device using one or more of the microphones on the voice activated electronic device. The one or more microphones on the voice activated device may be similar to microphone(s) 208 of FIG. 3 and the same description applies.

At step 1204, backend system 100 determines that there is a user account associated with the first electronic device. Step 1204 may be similar to step 1004 of process 1000 and the same description applies. In some embodiments, as in step 1004 of process 1000, the backend system may receive an identifier associated with the first electronic device. Once an identifier is received, the backend system may then identify a user account associated with the identifier.

At step 1206, the backend system generates first text data representing first audio data. Step 1206 may be similar to step 1006 of process 1000 and the same description applies. The text data may be generated by executing STT functionality on the received first audio data. The STT functionality of process 1200 may be accomplished by using Automatic Speech Recognition 258 shown in FIG. 3. The disclosure of Automatic Speech Recognition 258 of FIG. 3 and Speech-To-Text 266 of FIG. 3 applies here. Continuing the example, once the backend system received audio data stating "Alexa, play Song," Automatic Speech Recognition 258 may execute STT functionality on the audio data. This would create text data representing the received audio.

At step 1208, backend system 100 determines the intent of the first text data. Similarly to step 1008, after the back-end system has generated the first text data representing the first audio data, the text data would be sent to NLU for processing. The NLU processing in step 1208 may be similar to the NLU processing of step 1008 of process 1000 and the same description applies. The NLU receives the first text data to determine the intent of the first text data. The NLU described herein may be accomplished by using Natural Language Understanding 260 of FIG. 3. The same disclosure for FIG. 3 applies herein. Continuing the example, the NLU receives text data representing the audio data stating "Alexa, play Content." After recognizing the wakeword, the NLU may break apart and analyze the utterance "play Content." Allowing the NLU to better understand the intent, the NLU will break off and analyze the verb "play." As with process 1100, play can refer to many types of content such as songs or movies. In this embodiment, the noun is determinative because it is "Content." The word content as used in this embodiment refers to a specific content that the NLU would understand. However, persons of ordinary skill in the art understand that if the term "Content" referred to a title that can be two different songs, a process similar to process 1100 could be used to narrow down the choices. Next, the NLU may then search the backend system for a list of possible requests, assigning each a confidence score. Confidence scores and predetermined thresholds are explained in more detail above in the description of FIG. 8.

At step 1210, the backend system receives content responsive to the first audio data. The content may be anything that can be played on the first electronic device. If the NLU determines that the first audio data signaled "Content" should be played, the backend system may receive content from a specific content category. The content category may be similar or within Category Servers/Skills 262 of FIG. 3 and the same description applies. If the backend system is not sure of whether it retrieved the correct content, the backend system may generate text data representing a confirmation message. This text data may be converted into audio data using TTS functionality. Once the audio data is received by the backend system, the backend system may send the audio data to the first electronic device such that the audio message is played by one or more speakers on the voice activated electronic device. This message, for example, could be "Did you mean Content?" Once this confirmation message is sent, the content electronic device may receive responsive audio data. This audio data may be sent to the backend system where it will be converted to text data using STT functionality. The text data would then be analyzed by the NLU to determine whether the backend system had the correct content. If the NLU determines the response indicates that the backend system does not have the correct content, the backend system may stop the process.

At step 1212, the backend system sends the content to the first electronic device. Continuing the example, the content data, received from a category server or a skills server, is transmitted to the first electronic device. The content may then be played by the first electronic device by one or more microphones on the first electronic device. The one or more microphones on the first electronic device may be similar to microphone(s) 208 of FIG. 3 and the same description applies. In some embodiments, the backend system may generate text representing a confirmation message. This text would then be converted into audio by executing TTS functionality. The confirmation message might be sent to the first electronic device. The first electronic device may then output the confirmation message using one or more speakers. For example, the first electronic device may state, "Playing Content."

At step 1214, the backend system receives second audio data from the first electronic device. Step 1214 may be similar to step 1002 of process 1000 and the same description applies. The second audio data may represent an utterance spoken by an individual and may include a request. For example, if an individual stated "Alexa, play Content on my television," the first electronic device may record the stated phrase and send the audio data to the backend system. The second audio data may be recorded by the first electronic device using one or more of the microphones on the first electronic device.

At step 1216, the backend system generates second text data representing the second audio data. Step 1216 may be similar to step 1206 and to step 1006 of process 1000, the same descriptions apply. The second text data may be received by executing STT functionality on the received second audio data. The STT functionality of process 1200 may be accomplished by using Automatic Speech Recognition 258 shown in FIG. 3. The disclosure of Automatic Speech Recognition 258 of FIG. 3 and Speech-To-Text 266 of FIG. 3 applies here. Continuing the example, once the backend system received audio data stating "Alexa, play Song," Automatic Speech Recognition 258 may execute STT At step 1218, the backend system determines a second electronic device is also associated with the user account. After a user account associated with the identifier is identified, the backend system may then search for any additional devices associated with the user account. The associated device may be similar to the associated device of process 1000 and the same description applies. Additionally, the second electronic device with the user account described in process 1200 may be output electronic device 300 of FIGS. 1-3 and 5-6. The disclosure of output electronic device 300 applies equally to the second electronic device in process 1200.

At step 1220, the backend system determines that the intent of the second text data is requesting content on the second electronic device. The NLU may analyze the second text data representing the second audio data and determine a target device is in the second text data. The target device, in some embodiments, may be the second electronic device. The determination of a target device may be similar to steps 1132B and 1132C and the same description applies.

At step 1222, the backend system determines that the second content and the first content are the same. Similar to step 1008, after the back-end system has generated the second text data representing the second audio data, the text data would be sent to NLU for processing. The NLU processing in step 1218 may be similar to the NLU processing from both step 1208 and step 1008 of process 1000, the same descriptions apply. The NLU receives the first text data to determine the intent of the first text data. The NLU, going through a similar process as step 1208, may break up and analyze the verb, noun of the second text data. The NLU may then search the backend system for a list of possible requests, assigning each a confidence score. Confidence scores and predetermined thresholds are explained in more detail above in the description of FIG. 8. The NLU may then compare the first requested content and the second requested content to determine whether there is a complete match. This may be accomplished by comparing the analyzed second text to the analyzed first text and creating a confidence score. If the confidence score exceeds a predetermined threshold, then the backend system may determine that the contents are the same. For example, the NLU may determine that the second text data's mention of "Content" is the same content as mentioned in the first text data. In some embodiments, the backend system may determine confirmation is necessary. If that is the case, the backend system may generate confirmation text. This confirmation text can represent a question, asking if the song should be transferred to the second electronic device. For example, the confirmation text can represent a question asking "Would you like to play Content on your television?" This confirmation text data would then be converted into confirmation audio data by executing TTS functionality on the confirmation text data. Once received by the backend system, the confirmation audio may then be sent to the first electronic device such that the confirmation audio is played by one or more speakers on the first electronic device. For example, the first electronic device may state "Would you like to play Content on your television?"

The first electronic device may then receive responsive audio to the confirmation audio. The responsive audio may then be transmitted to the backend system. As in step 1206, the responsive audio would then be converted to text by executing STT functionality on the responsive audio. Once the backend system receives the text representing the responsive audio, the text would then be sent to the NLU for analysis. The NLU would determine whether the response is a positive or negative response. If the response is positive, the process would continue with step 1224 below. A positive response, for example, may be "Yes." If the response is a negative response the process may stop and Content may play on the first electronic device. A negative response, for example, may be "No."

At step 1224, the backend system determines generates stop instructions. The stop instructions may be for the purposes of stopping the content being played by the first electronic device. The stop instructions may direct the first electronic device to stop playing Content.

At step 1226, the backend system sends the stop instructions to the first electronic. Once the backend system has generated the stop instructions, the backend system may then send the stop instructions to the first device to stop playing the content. The voice activated electronic device would receive the instruction and stop the content. In some embodiments, the backend system may generate text representing a notification message. The purpose of the notification message may be to notify an individual that the content will continue playing on the associated device. The notification text would be converted to notification audio by executing TTS functionality on the notification text. Once the backend system has received the notification audio, the notification audio would be transmitted to the first electronic device such that the notification audio is played by one or more speakers on the first electronic device. For example, the voice activated electronic device may state "Content will be played on your television." In some embodiments the notification audio may be played by one or more speakers on the second electronic device. In this embodiment, the notification audio would be sent to the second electronic device instead of, or in addition to, the first electronic device.

At step 1228, the backend system receives responsive content to the second audio data. Similar to step 1210, the content may be anything that can be played on the second electronic device. In some embodiments, the content may be a Content. Persons of ordinary skill recognize that the use of Content is merely exemplary. The backend system may receive the same content that was playing on first electronic device.

At step 1230, the backend system sends the second content to the second electronic device. The second content data may then be played by the second electronic device by one or more microphones on the second electronic device. The one or more microphones on the second electronic device may be similar to speakers 314 of FIG. 3 and the same description applies. In some embodiments, the backend system may generate text representing a confirmation message. This text would then be converted into audio by executing TTS functionality. The confirmation message might be sent to the second electronic device. The second electronic device may then output the confirmation message using one or more speakers. For example, the voice activated electronic device may state, "Playing Content." In some embodiments the confirmation audio may be played by one or more speakers on the first electronic device. In this embodiment, the confirmation audio would be sent to the first electronic device instead of, or in addition to, the second electronic device.

FIG. 11A is an illustrative flowchart of process 1300 for routing content based on a state of an associated device in accordance with various embodiments. Process 1300, as with process 1300, may be implemented in, for example, backend system 100 and the same description applies herein. Persons of ordinary skill in the art will recognize that, in some embodiments, steps within process 1300 may be rearranged or omitted. In some embodiments, process 1300 may begin at step 1302. At step 1302, backend system 100 may receive first audio data from a first electronic device. Step 1202 may be similar to step 1002 of process 1000 and the same description applies. The first electronic device of process 1300, may, in some embodiments, be voice activated device 10 of FIGS. 1-3 and 5-6 and the same descriptions apply. The first audio data may represent an utterance spoken by an individual and may include a request. For example, if an individual stated "Alexa, play Song on the television," the first electronic device may record the stated phrase and send the audio data to the backend system. The first audio data may be received by the first electronic device using one or more of the microphones on the first electronic device. The one or more microphones on the first electronic device may be similar to microphone(s) 208 of FIG. 3 and the same description applies.

At step 1304, the backend system determines that there is a user account associated with the first electronic device. Step 1304 may be similar to step 1004 of process 1000 and the same description applies. In some embodiments, as in step 1004 of process 1000, the backend system may receive an identifier associated with the voice activated electronic device. Once an identifier is received, the backend system may then identify a user account associated with the identifier. After a user account associated with the identifier is identified, the backend system may then search for any additional devices associated with the user account.

At step 1306, the backend system may determine the first audio data came from an input device within a stored association. The stored association may be stored on the user account. In some embodiments, there may be stored associations on the backend system. A stored association may be similar the association shown in FIG. 7 and the same description applies. For example, the backend system may determine that the first audio data came from a voice activated electronic device. Once determined where the audio came from, the backend system may recognize that the voice activated electronic device is an input device within a stored association. The stored association may be between a voice activated electronic device and a television. In an example, the stored association may have the voice activated electronic device as the input device and the television as the output device. Furthermore, there might be a stored content preference. For example, the stored content preference may be for songs. If this is the case, requests for songs that come from the voice activated electronic device will be output on the television.

At step 1308, the backend system may determine a content preference and output device in the stored association. In some embodiments, an association may have one input device and one output device. Once it is determined that the first audio came from an input device in a stored association, the backend system may determine what the output device is. Furthermore, the backend system may determine what, if any, are the content preferences. For example, the stored association may be between a voice activated electronic device and a television. The voice activated electronic device may be the input device. The television may be the output device. Furthermore, there may be a content preference. If so, the content preference may determine whether the received audio data from the input device triggers the association. For example, if the content preference is an audio book, that would mean that any time audio received from the voice activated electronic device requests an audio book, the audio book would be played on the television. In some embodiments, this step may be omitted.

At step 1310, the backend system may generate first text data representing the first audio data. Step 1310 may be similar to step 1006 of process 1000 and the same description applies. The text data may be generated by executing STT functionality on the received first audio data. The STT functionality of process 1300 may be accomplished by using Automatic Speech Recognition 258 shown in FIG. 3. The disclosure of Automatic Speech Recognition 258 of FIG. 3 and Speech-To-Text 266 of FIG. 3 applies here. Continuing the example, once the backend system received audio data stating "Alexa, play Song on the television," Automatic Speech Recognition 258 may execute STT functionality on the audio data. This would create text data representing the received audio.

At step 1312, backend system 100 may determine the intent of the first text data. Similar to step 1008, after the back-end system has generated the first text data representing the first audio data, the text data would be sent to NLU for processing. The NLU processing in step 1308 may be similar to the NLU processing of step 1008 of process 1000 and the same description applies. The NLU receives the first text data to determine the intent of the first text data. The NLU described herein may be accomplished by using Natural Language Understanding 260 of FIG. 3. The same disclosure for FIG. 3 applies herein. Continuing the example, the NLU receives text data representing the audio data stating "Alexa, play Song." After recognizing the wakeword, the NLU may break apart and analyze the utterances "play Song," and "on the television." Allowing the NLU to better understand the intent, the NLU will break off and analyze the verb "play." As with process 1100, play can refer to many types of content such as songs or movies. In this embodiment, the noun is determinative because it is "Song." The word song as used in this embodiment refers to a specific movie that the NLU would understand. If "Song" was not determinative, a process similar to process 1100 may be used by the backend system to narrow down the intent of the utterance. Next, the NLU may then search the backend system for a list of possible requests, assigning each a confidence score. Confidence scores and predetermined thresholds are explained in more detail above in the description of FIG. 8. The NLU may determine that the intent of the first text data is a request to play Song.

At step 1314, the backend system may determine the type of content requested is the same type of content stored in the association. In some embodiments, a stored association may have a content preference. Once the backend system has determined that the audio received was from an input device within an association, the backend system may look to see if there is a content preference. If there is a content preference, the backend system may try to match the requested content type and the stored content preference. For example, when the NLU has determines the intent of the first text data, the NLU may determine the type of content requested. After determining the type of content requested, the NLU may try and match the type of content requested with the stored content preference within the association. If the requested content type matches the stored preference, the NLU would know where to send the content. For example, if the stored preference is songs, the NLU would try and match the requested content type with songs. Continuing the above example, because the requested content is Song, then the NLU would know the target device would be the output device in the association. Because, in this embodiment, the output device is the television, the Song requested by the input device would be played on the television. In some embodiments, this step may be omitted.

In some embodiments, the type of content requested will not match the content preference. If this is the case, the backend system may operate in a similar manner to processes 1000 and 1100. In some embodiments, there is no content preference. If this is the case, the content may be routed to the output device based if the output device can output the requested content. If the output device cannot output the requested content, the input device, or any other associated device, may output the requested content.

At step 1316, the backend system determines whether the second electronic device is ready, available or unavailable. In some embodiments "ready, available, or unavailable," may be referred to as functional states. Once the backend system has determined that, because of the association, content will be routed to the second electronic device, the backend system may determine whether the second electronic device can receive the content. In some embodiments, if there is an association, the status of the second electronic device may be stored in the association. Furthermore, in some embodiments, the backend system may send a status request to the second electronic device. The status request may come from content routing module 270 of FIG. 3 and the same description applies. The status request sent by the backend system may determine what state the associated device is in. The state of the associated device may help determine whether content can be routed to the associated device. In some embodiments, there are three states: unavailable, ready, and available. While only three states are disclosed, persons having ordinary skill in the art will recognize that any number of states can be used and would be effective in determining whether content can be routed to an associated device. The backend system may send simulated tests or any other suitable means of determining whether the second electronic device may output the requested content. Situations for each state are described in more detail below in the descriptions for FIGS. 11B-11D.

Figure 11B:
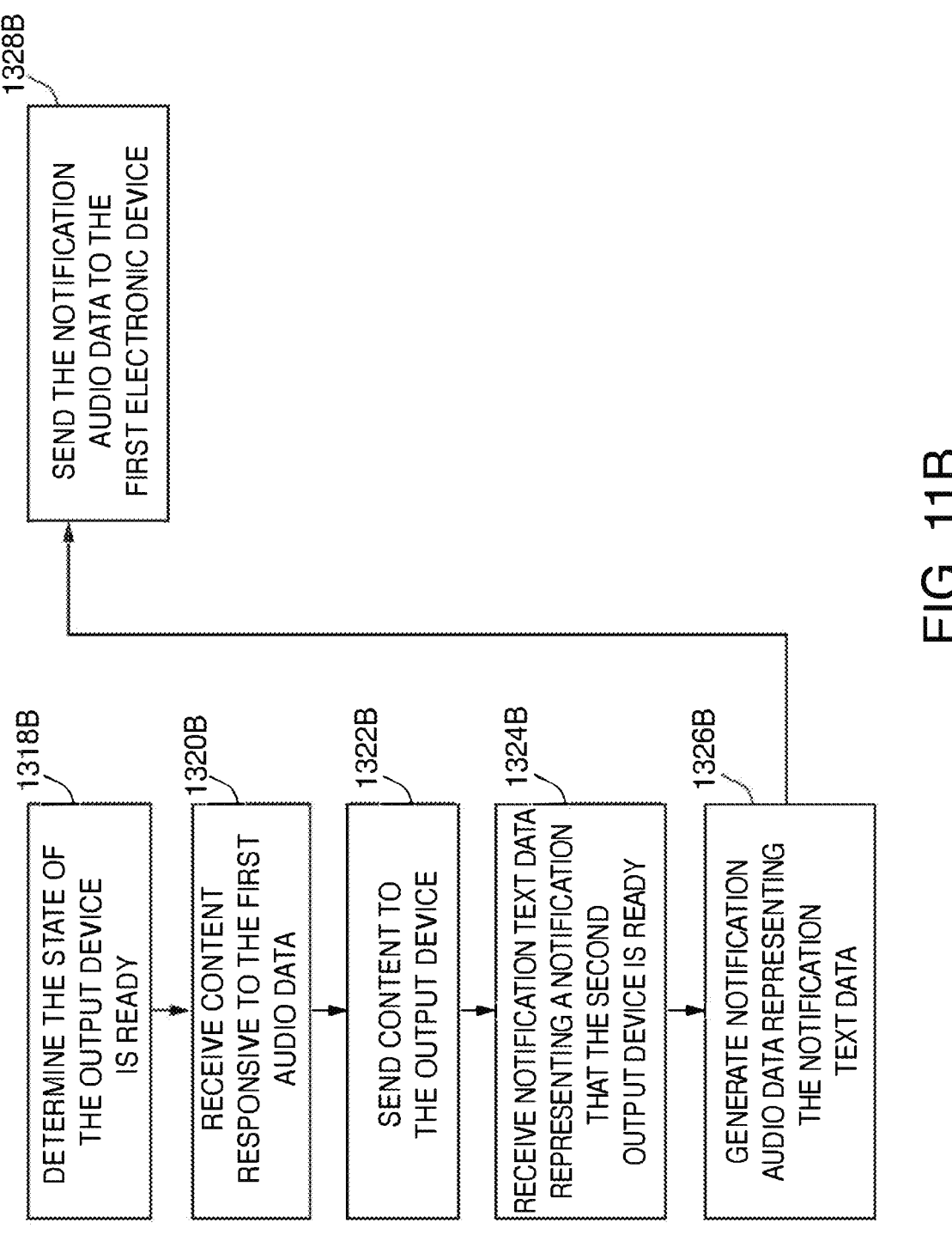
FIG. 11B is an illustrative flowchart continuing the process in FIG. 11A where the state of an associated device is ready in accordance with various embodiments.

FIG. 11B is an illustrative flowchart continuing the process in FIG. 11A where the state of an associated device is ready in accordance with various embodiments. Continuing process 1300 in FIG. 11A, at step 1318B, the backend system determines that the state of the output device is ready. In some embodiments, the ready state of the output device may be determined by a response to the status request sent from the second electronic device to the backend system. This response may come in the form of metadata. In some embodiments, the ready state of the output device may be determined by a saved status update that is sent by the output device to the backend system. This saved status update might be sent at regular intervals or may be sent only once when the output device becomes ready. In some embodiments, a test may have been sent to the output device. This test may have been successfully run, determining that the second electronic device may be capable of outputting the requested content.

At step 1320B, the backend system receives content responsive to the first audio data. The content may be anything that can be played on the first electronic device or the second electronic device. In some embodiments, the content may be a song. If the NLU determines that the first audio data signaled "Song" should be played, the backend system may receive audio data from a song category. The song category may be similar or within Category Servers/Skills 262 of FIG. 3 and the same description applies. If the backend system is not sure of whether it retrieved the correct song, the backend system may generate text data representing a confirmation message. This text data may be converted into audio data using TTS functionality. Furthermore, the backend system may receive listening instructions. These listening instructions may be similar to the listening instructions of process 1000 and the same description applies. Once the audio data is received by the backend system, the backend system may send the audio data to the first electronic device such that the audio message is played by one or more speakers on the first electronic device. This message, for example, could be "Did you mean Song?" Following the played audio, the backend system will send the listening instructions to the first electronic device. Once this confirmation message and listening instructions are sent, the first electronic device may receive responsive audio data. This audio data may be sent to the backend system where it will be converted to text data using STT functionality. The text data would then be analyzed by the NLU to determine whether the backend system had the correct song. If the NLU determines the response indicates that the backend system does not have the correct song, the backend system may stop the process. In some embodiments, this step may be omitted. In some embodiments, the content may be stored locally.

At step 1322B, the backend system sends the content to the output device. Continuing the Song example, the audio data, received from a category server or a skills server, is transmitted to the output device. Output device of process 1300 may be similar to output electronic device 300 of FIG. 3 and the same description applies. The audio data may then be played by one or more speakers of the output device. The one or more speakers of the output device may be similar to speakers 314 of FIG. 3 and the same description applies.

In some embodiments, the backend system may determine that the user account is capable of accessing the content. This may be done similarly to step 1134B and step 1134C of FIGS. 8B and 8C respectively and the same descriptions apply. The backend system may also generate a URL that allows the second electronic device to stream the received content. This may be done similarly to step 1136B and step 1136C of FIGS. 8B and 8C respectively and the same descriptions apply. Furthermore, the generated URL may be sent to the second electronic device allowing the second electronic device to stream the requested content. This may be done similarly to step 1138B and step 1138C of FIGS. 8B and 8C respectively and the same descriptions apply.

At step 1324B, the backend system receives notification text data representing a notification that the output device is ready. In some embodiments, the backend system may generate text representing a notification message that the output device is ready. This notification text may be generated using the Content Routing Module 270 of FIG. 3 and the same description applies. For example, the text representing a notification might state "Your television is ready."

At step 1326B, the backend system generates notification audio data representing the notification text data. Once the notification text data has been received by the backend system, the notification text data is converted into audio data. The notification text data is converted into audio data by executing TTS functionality on the notification text data. The TTS functionality may be similar to Text-To-Speech 264 of FIG. 3, and the same description applies. For example, the confirmation audio data may state, "Your television is ready."

At step 1328B, the backend system sends the notification audio data to the first electronic device. The notification audio data, generated from TTS, is transmitted to the first electronic device. The audio data may then be played by the first electronic device using one or more microphones on the first electronic device. The one or more microphones on the first electronic device may be similar to microphone(s) 208 of FIG. 3 and the same description applies. For example, the voice activated electronic device may state "Your television is ready."

Figure 11C:
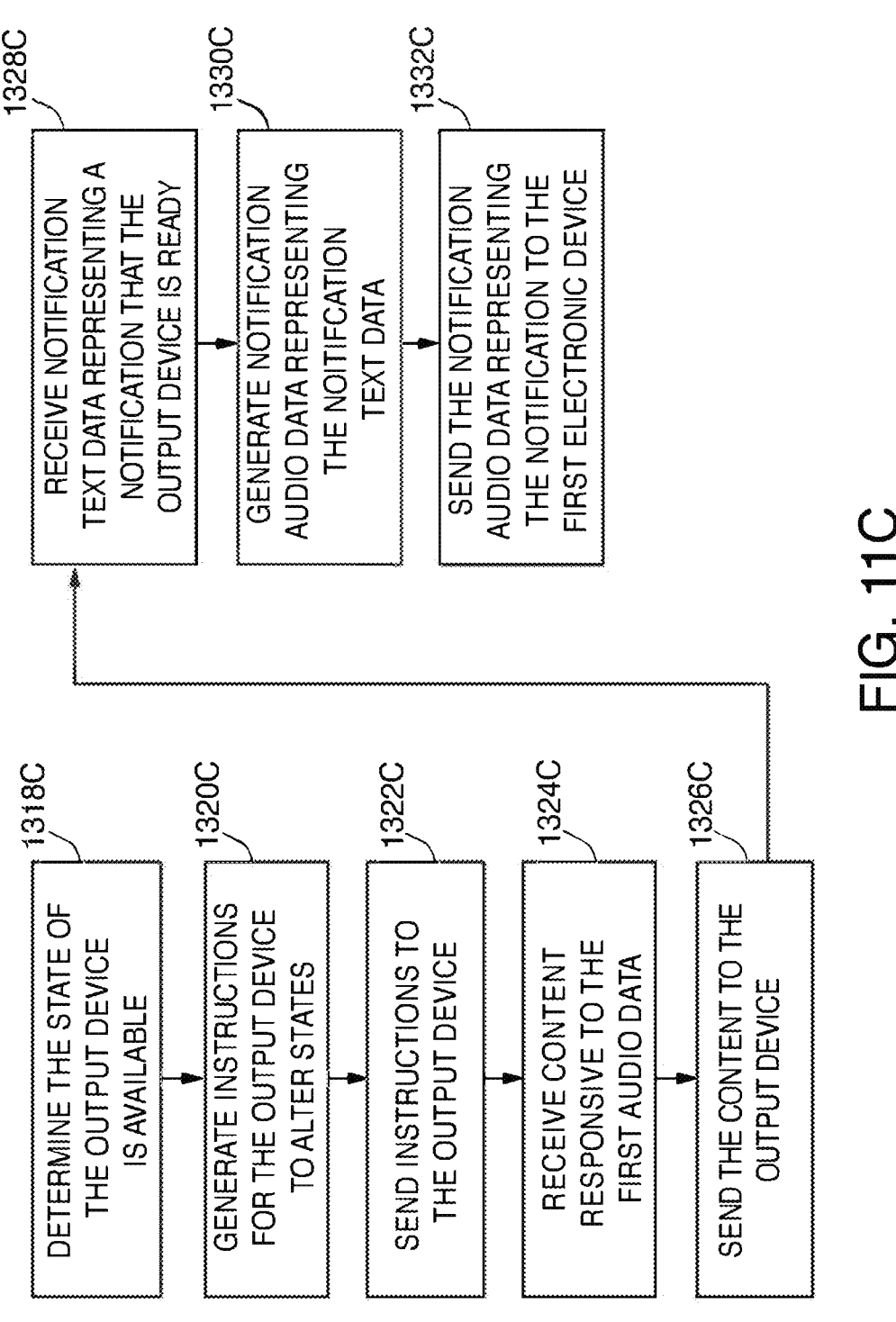
FIG. 11C is an illustrative flowchart continuing the process in FIG. 11A where the state of an associated device is available in accordance with various embodiments.

FIG. 11C is an illustrative flowchart continuing the process in FIG. 11A where the state of an associated device is available in accordance with various embodiments. Continuing process 1300 in FIG. 11A, at step 1318C, the backend system determines that the state of the output device is available. In some embodiments, the available state of output device may be determined by a response to the status request sent from the output device. This response may come in the form of metadata. In some embodiments, the available state of the output device may be determined by a saved status update that is sent by the second electronic device to the backend system. This saved status update might be sent at regular intervals or may be sent only once the output device becomes available.

At step 1320C, the backend system generates instructions for the output device to alter states. In response to determining that the output device is available, the backend system may generate instructions to alter the output device's state from available to ready. While it may be an indication that the output device is powered on, the available state may not allow the output device to play any content. The output device may, in some embodiments, be in an available state because the output device is already playing content. If this is the case, the generated instructions may include instructions to stop playing the content.

At step 1322C, the backend system sends the instructions to the output device. Once the instructions have been generated, the backend system may send the generated instructions to alter the output device's state from available to ready, allowing the content to be transmitted and played by the output device. In some embodiments, once the output device alters its state, a confirmation notice may be sent from the output device to the backend system. This notice may confirm that the output device is in a ready state and can receive and output content.

At step 1324C, the backend system receives content responsive to the first audio data. Step 1324C may be similar to step 1320B, and the same descriptions apply. In some embodiments, the content may be a movie. If the NLU determines that the content signaled "Movie" should be played, the backend system may receive video data from a movie category. The movie category may be similar or within Category Servers/Skills 262 of FIG. 3 and the same description applies. In some embodiments, this step may be omitted.

At step 1326C, the backend system sends the content to the output device. Continuing the example, the video data, received from a category server or a skills server, is transmitted to the second electronic device. Second electronic device of process 1300 may be similar to output electronic device 300 of FIG. 3 and the same description applies. The video data may then be played by one or more speakers and a display screen of the output device. The one or more speakers of the output device may be similar to speakers 314 of FIG. 3 and the same description applies. The display screen of the output device may be similar to display 312 of FIG. 3 and the same description applies.

In some embodiments, the backend system may determine that the user account is capable of accessing the content. This may be done similarly to step 1134B and step 1134C of FIGS. 8B and 8C respectively and the same descriptions apply. The backend system may also generate a URL that allows the second electronic device to stream the received content. This may be done similarly to step 1136B and step 1136C of FIGS. 8B and 8C respectively and the same descriptions apply. Furthermore, the generated URL may be sent to the second electronic device allowing the second electronic device to stream the requested content. This may be done similarly to step 1138B and step 1138C of FIGS. 8B and 8C respectively and the same descriptions apply.

At step 1328C, the backend system receives notification text data representing a notification that the output device is ready. This step may be similar to step 1324B of FIG. 11B and the same description applies. In some embodiments, the backend system may receive text representing a notification message that the second electronic device is ready. This notification text may be generated using the Content Routing Module 270 of FIG. 3 and the same description applies. For example, the text representing a notification might state "Your television is ready."

At step 1330C, the backend system generates notification audio data representing the notification text data. This step may be similar to step 1326B of FIG. 11B and the same description applies. Once the notification text data has been received by the backend system, the notification text data is converted into audio data. The notification text data is converted into audio data by executing TTS functionality on the notification text data. The TTS functionality may be similar to Text-To-Speech 264 of FIG. 3, and the same description applies. For example, the confirmation audio data may state, "Your television is ready."

At step 1332C, the backend system sends the notification audio data representing the notification to the first electronic device. This step may be similar step 1328B of FIG. 11B and the same description applies. The notification audio data, generated by TTS, is transmitted to the first electronic device. The audio data may then be played by the first electronic device by one or more microphones on the first electronic device. The one or more microphones on the first electronic device may be similar to microphone(s) 208 of FIG. 3 and the same description applies. For example, the first device may state "Your television is ready."

Figure 11D:
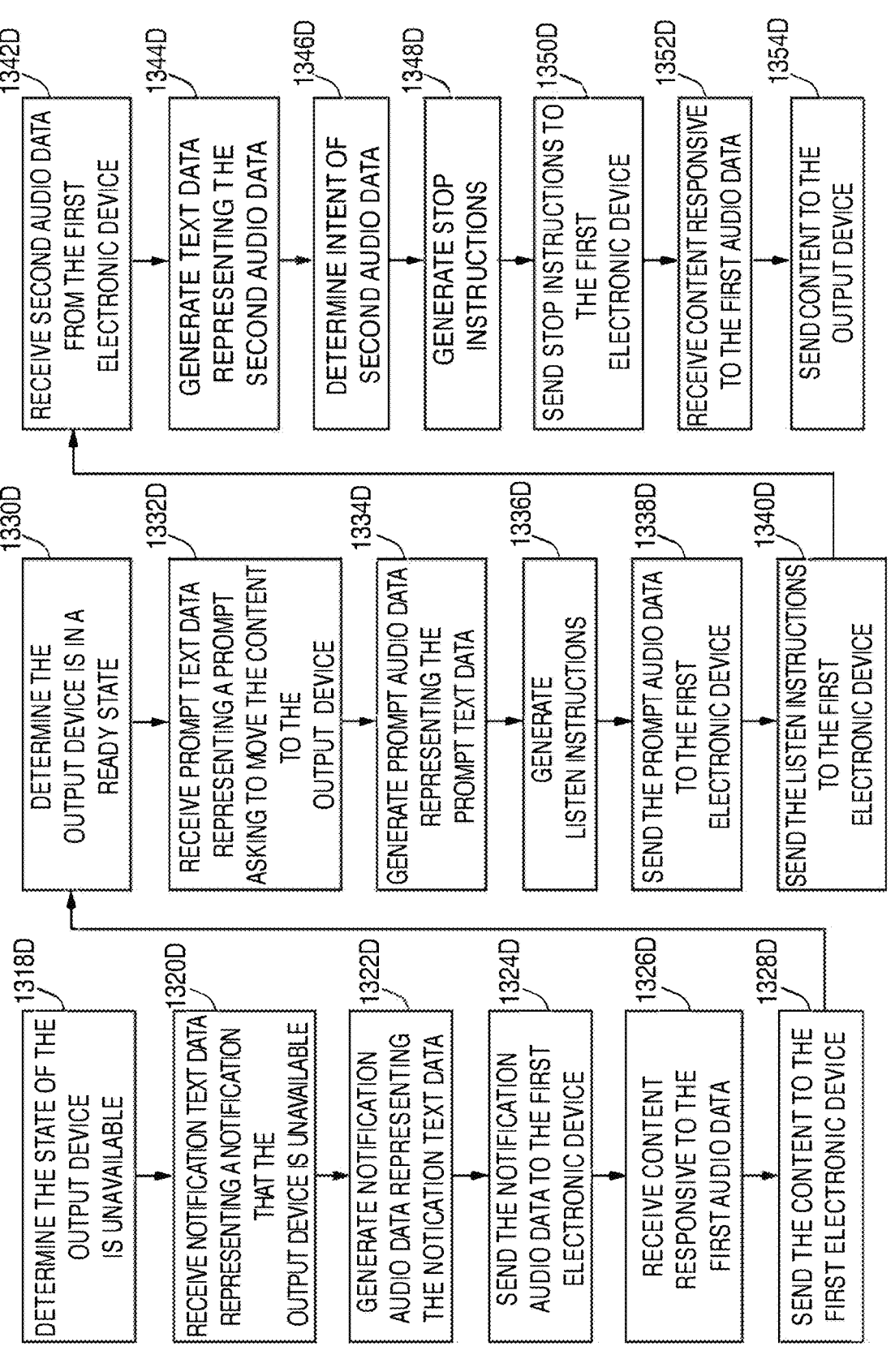
FIG. 11D is an illustrative flowchart continuing the process in FIG. 11A where the state of an associated device is unavailable in accordance with various embodiments.

FIG. 11D is an illustrative flowchart continuing the process in FIG. 11A where the state of an associated device is unavailable in accordance with various embodiments. Continuing process 1300 in FIG. 11A, at step 1318D, the backend system determines that the state of the output device is unavailable. In some embodiments, this may be accomplished by not receiving a response to the status request for a predetermined amount of time. For example, if the backend system sends a status request to the output device, the backend system may wait for two seconds to receive a response. If the response is not received within that two second window, then the backend system may determine that the output device is unavailable. In some embodiments, this may be accomplished by having a saved status from when the output device became unavailable. In some embodiments, the status may be determined by sending a test to the output device. If the test fails, the backend system may determine that the output device is unavailable.

At step 1320D, the backend system receives notification text data representing a notification that the output device is available. In some embodiments, the backend system may receive text representing a notification message that the output device is unavailable. This notification text may be generated using the Content Routing Module 270 of FIG. 3 and the same description applies. For example, the text representing a notification might state "Your television is unavailable."

At step 1322D, the backend system generates notification audio data representing the notification text data. Once the notification text data has been received by the backend system, the notification text data is converted into audio data. The notification text data is converted into audio data by executing TTS functionality on the notification text data. The TTS functionality may be similar to Text-To-Speech 264 of FIG. 3, and the same description applies. For example, the confirmation audio data may state, "Your television is unavailable."

At step 1324D, the backend system sends the notification audio data to the first electronic device. The notification audio data, generated by TTS, is transmitted to the first electronic device. The audio data may then be played by the first electronic device by one or more microphones on the first electronic device. The one or more microphones on the first electronic device may be similar to microphone(s) 208 of FIG. 3 and the same description applies. For example, the first electronic device may play "Your television is unavailable." In some embodiments, the process may stop here. However, in some embodiments, the content may be played on the first electronic device. In some embodiments, the backend system may receive text representing a confirmation message requesting whether a user would like to play the content on the first electronic device. In this embodiment, the received text would be converted into audio data by executing TTS functionality on the text. The backend system may then generate listening instructions. The listening instructions, as described, may be similar to the listening instructions of process 1100 and the same descriptions apply herein. The audio would then be sent to the first electronic device. For example, the first electronic device may play "Would you like to play Song on the voice activated electronic device?" Following sending the audio, the backend system may send the listening instructions to the first electronic device such that the first electronic device records and sends a response. The backend system may then receive a response. Once the backend system generates the text representing the responsive audio, the text would then be analyzed by the NLU. The NLU would determine whether the response is a positive or negative response. If the response is positive, the content would be played on the first electronic device. A positive response, for example, may be "Yes." If the response is a negative response the process may stop. A negative response, for example, may be "No."

At step 1326D, the backend system receives content responsive to the first audio data. If the NLU determines the content requested to be played on the second electronic device can also be played on the first electronic device, the backend system may receive content responsive to the first audio data. The process for determining what kind of content can be played on what kind of device is described in more detail in the descriptions of FIGS. 4, 8A, 8B, and 8C and the descriptions apply herein. For example, if an individual requested that a song be played on his/her television, the backend system may determine that this content may be played on either the second electronic device (i.e. television) or the first electronic device. However, if a movie was requested, the backend system may determine that the content cannot be played on the first electronic device (i.e., if the first electronic device does not have a display screen) and the process may stop. Continuing the Song example, the backend system may receive Song from a song category. This category may be similar to Category Servers/Skills 262 of FIG. 3 and the same description applies. In some embodiments, this step may be omitted.

At step 1328D, the backend system sends the content to the first electronic device. The content, received from a category server or a skills server, is transmitted to the first electronic device. The content may then be played by one or more speakers of the first electronic device. The one or more speakers of the first electronic device may be similar to speaker(s) 210 of FIG. 3 and the same description applies. In some embodiments, the process may end here and the content may finish playing on the first electronic device.

In some embodiments, the backend system may determine that the user account is capable of accessing the content. This may be done similarly to step 1134B and step 1134C of FIGS. 8B and 8C respectively and the same descriptions apply. The backend system may also generate a URL that allows the first electronic device to stream the received content. This may be done similarly to step 1136B and step 1136C of FIGS. 8B and 8C respectively and the same descriptions apply. Furthermore, the generated URL may be sent to the first electronic device allowing the first electronic device to stream the requested content. This may be done similarly to step 1138B and step 1138C of FIGS. 8B and 8C respectively and the same descriptions apply.

At step 1330D, the backend system determines the output device is in a ready state. In some embodiments, the ready state of the output device may be determined by a response to the status request sent from the output device to the backend system. For example, if the output device was just turned on, a response to a sent status report might be sent to the backend system indicating the output device was turned on and is ready to receive content. In some embodiments, the ready state of the output device may be determined by a status update being sent when the output device was turned on. This might happen every time the output device is turned on and may be stored by the backend system.

At step 1332D, the backend system receives text data representing a prompt asking to move the content to the output device. Once the backend system determines the output device is in a ready state, the backend system may receive prompt text data representing a prompt asking whether the content should be moved to the output device. This notification text may be received from the Content Routing Module 270 of FIG. 3 and the same description applies. For example, the text representing a notification might state "Should the content be moved to the television?"

At step 1334D, the backend system generates prompt audio data representing the prompt text data. Once the prompt text data has been received by the backend system, the prompt text data is converted into audio data. The prompt text data is converted into audio data by executing TTS functionality on the prompt text data. The TTS functionality may be similar to Text-To-Speech 264 of FIG. 3, and the same description applies. For example, the prompt audio data may state, "Should the content be moved to the television?"

At step 1336D, the backend system generates listening instructions. The listening instruction of process 1300 may be similar to the listening instructions of process 1100 and the same description applies. Before sending the prompt, the backend system may generate listening instructions for the first electronic device. The listening instructions may instruct the first electronic device to record a response to the prompt and send that response to the backend system. In some embodiments, the listening instructions instruct the first electronic device to record without waiting for a wakeword.

At step 1338D, the backend system sends the prompt audio data to the first electronic device. The prompt audio data, received from TTS, is transmitted to the first electronic device. The audio data may then be played by the first electronic device by one or more microphones on the first electronic device. The one or more microphones on the first electronic device may be similar to microphone(s) 208 of FIG. 3 and the same description applies. For example, the voice activated electronic device may state "Should the content be moved to the television?"

At step 1340D, the backend system sends the listening instructions to the first electronic device. The generated listening instructions may be sent to the first electronic device in order to instruct the first electronic device to record a response to the prompt. That recorded response may then be sent back to the backend system. Step 1338D may be similar to step 1122 of process 1100 in FIG. 8A and the same description applies.

At step 1342D, the backend system receives second audio data from the first electronic device. The second audio data may represent a response to the prompt that was recorded by the first electronic device. The first electronic device may record the response by using one or more of its microphones. The one or more microphones on the first electronic device may be similar to microphone(s) 208 of FIG. 3 and the same description applies. For example, the audio data may represent a response stating "Yes, play the content on my television."

At step 1344D, the backend system generates text data representing the second audio data. Step 1344D may be similar to step 1006 of process 1000 and the same description applies. The text data may be generated by executing STT functionality on the received second audio data. The STT functionality of process 1300 may be accomplished by using Automatic Speech Recognition 258 shown in FIG. 3. The disclosure of Automatic Speech Recognition 258 of FIG. 3 and Speech-To-Text 266 of FIG. 3 applies here. Continuing the example, once the backend system received audio data stating "Yes, play the content on my television," Automatic Speech Recognition 258 may execute STT functionality on the audio data. This would create text data representing the received audio.

At step 1346D, the backend system determines the intent of the second audio data. Once the backend system generates the text representing the second audio data, the text would then be analyzed by the NLU. The NLU would determine whether the response is a positive or negative response. If the response is positive, the content would be played on the second electronic device. A positive response, for example, may be "Yes." If the response is a negative response the content would remain on the voice activated electronic device. A negative response, for example, may be "No." For example, if an individual responded to the prompt with "No," Song may continue play on the first electronic device.

At step 1348D, the backend system generates stop instructions. Step 1346D may be similar to step 1224 of FIG. 10 and the same description applies. The stop instructions may be for the purposes of stopping the content being played by the first electronic device. The stop instructions may direct the first electronic device to stop playing the content currently being output on the first electronic device.

At step 1350D, the backend system sends the stop instructions to the first electronic device. The first electronic device may receive the instruction and stop the content. In some embodiments, the backend system may receive text representing a notification message. The purpose of the notification message may be to notify an individual that the content will continue playing on the second electronic device. The notification text would be converted to notification audio by executing TTS functionality on the notification text. Once the backend system has generated the notification audio, the notification audio would be transmitted to the first electronic device such that the notification audio is played by one or more speakers on the first electronic device. For example, the voice activated electronic device may state "Your content will be played on your television." In some embodiments the notification audio may be played by one or more speakers on the second electronic device. In this embodiment, the notification audio would be sent to the second electronic device instead of, or in addition to, the first electronic device.

At step 1352D, the backend system receives content responsive to the first audio data. The backend system may receive the same content that was playing on first electronic device. In some embodiments, the backend system may generate text data representing a confirmation message. Step 1352D may be similar to step 1326D and the same description applies. In some embodiments, this step may be omitted.

At step 1354D, the backend system sends the content to the output device. The content may then be played by output device by one or more microphones on the output. In some embodiments, the backend system may receive text representing a confirmation message. This text would then be converted into audio by executing TTS functionality. The confirmation message might be sent to the first electronic device. The first electronic device may then output the confirmation message using one or more speakers. For example, the voice activated electronic device may state, "Playing Content." In some embodiments the confirmation audio may be played by one or more speakers on the output device. In this embodiment, the confirmation audio would be sent to the output device instead of, or in addition to, the first electronic device.

In some embodiments, the backend system may determine that the user account is capable of accessing the content. This may be done similarly to step 1134B and step 1134C of FIGS. 8B and 8C respectively and the same descriptions apply. The backend system may also generate a URL that allows the second electronic device to stream the received content. This may be done similarly to step 1136B and step 1136C of FIGS. 8B and 8C respectively and the same descriptions apply. Furthermore, the generated URL may be sent to the second electronic device allowing the second electronic device to stream the requested content. This may be done similarly to step 1138B and step 1138C of FIGS. 8B and 8C respectively and the same descriptions apply.

The various embodiments of the invention may be implemented by software, but may also be implemented in hardware, or in a combination of hardware and software. The invention may also be embodied as computer readable code on a computer readable medium. The computer readable medium may be any data storage device which may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method performed by a computing system connected to a network, the method comprising:
   receiving, from a first electronic device and via the network, first data representing a natural language input;
   determining, based at least in part on the first data, a request corresponding to the natural language input;

determining that a second electronic device associated with the first electronic device is capable of processing second data corresponding to the request;

determining third data representing a response to the natural language input;

sending, to the first electronic device via the network, the third data, such that the response is output by the first electronic device; and sending, to the second electronic device and via the network, the second data.

2. The method of claim 1, wherein:

the first data comprises first audio data;

the method further comprises performing speech processing using the first audio data.

3. The method of claim 1, further comprising:

determining a user account associated with the first electronic device; and determining that the second electronic device is associated with the user account.

4. The method of claim 1, wherein:

determining that the second electronic device is capable of processing the second data comprises determining that the second electronic device is capable of processing video data.

5. The method of claim 4, wherein sending the second data to the second electronic device comprises sending a uniform resource locator (URL) to the second electronic device that allows the second electronic device to obtain the video data.

6. The method of claim 1, wherein the response comprises a message indicating that video corresponding to the second data will be displayed by a screen associated with the second electronic device.

7. The method of claim 1, wherein the response comprises a message indicating that audio corresponding to the second data will be output by a speaker associated with the second electronic device.

8. The method of claim 1, wherein the response comprises an indication that an action corresponding to the request has been performed.

9. The method of claim 1, further comprising:

determining that the second electronic device is in a state in which the second electronic device is ready to process the second data; and sending the second data to the second electronic device based at least in part on the second electronic device being in the state.

10. The method of claim 1, further comprising:

determining that the second electronic device is not ready to process the second data; and sending, to the second electronic device via the network, a command that causes the second electronic device to change to a state in which the second electronic device is ready to process the second data.

11. A computing system, comprising:

at least one processor; and at least one computer-readable medium encoded with instructions which, when executed by the at least one processor, cause the computing system to:

receive, from a first electronic device and via a network, first data representing a natural language input;

determine, based at least in part on the first data, a request corresponding to the natural language input;

determine that a second electronic device associated with the first electronic device is capable of processing second data corresponding to the request;

determine third data representing a response to the natural language input;

send, to the first electronic device via the network, the third data, such that the response is output by the first electronic device; and send, to the second electronic device and via the network, the second data.

12. The computing system of claim 11, wherein the first data comprises first audio data, and the at least one computer-readable medium is encoded with additional instructions which, when executed by the at least one processor, further cause the computing system to:

perform speech processing using the first audio data.

13. The computing system of claim 11, wherein the at least one computer-readable medium is encoded with additional instructions which, when executed by the at least one processor, further cause the computing system to:

determine a user account associated with the first electronic device; and determine that the second electronic device is associated with the user account.

14. The computing system of claim 11, wherein the at least one computer-readable medium is encoded with additional instructions which, when executed by the at least one processor, further cause the computing system to:

determine that the second electronic device is capable of processing the second data at least by determining that the second electronic device is capable of processing video data.

15. The computing system of claim 14, wherein the at least one computer-readable medium is encoded with additional instructions which, when executed by the at least one processor, further cause the computing system to:

send the second data to the second electronic device at least by sending a uniform resource locator (URL) to the second electronic device that allows the second electronic device to obtain the video data.

16. The computing system of claim 11, wherein the response comprises a message indicating that video corresponding to the second data will be displayed by a screen associated with the second electronic device.

17. The computing system of claim 11, wherein the response comprises a message indicating that audio corresponding to the second data will be output by a speaker associated with the second electronic device.

18. The computing system of claim 11, wherein the response comprises an indication that an action corresponding to the request has been performed.

19. The computing system of claim 11, wherein the at least one computer-readable medium is encoded with additional instructions which, when executed by the at least one processor, further cause the computing system to:

determine that the second electronic device is in a state in which the second electronic device is ready to process the second data; and send the second data to the second electronic device based at least in part on the second electronic device being in the state.

20. The computing system of claim 11, wherein the at least one computer-readable medium is encoded with additional instructions which, when executed by the at least one processor, further cause the computing system to:

determine that the second electronic device is not ready to process the second data; and send, to the second electronic device via the network, a command that causes the second electronic device to change to a state in which the second electronic device is ready to process the second data.

* * * * *